US010914207B2

(12) United States Patent
Girondi

(10) Patent No.: US 10,914,207 B2
(45) Date of Patent: Feb. 9, 2021

(54) VALVE GROUP FOR A PRESSURISED OIL CIRCUIT

(71) Applicant: UFI FILTERS S.p.A., Mantova (IT)

(72) Inventor: Giorgio Girondi, Mantova (IT)

(73) Assignee: UFI FILTERS S.p.A., Mantova (IT)

(*) Notice: Subject to any disclaimer, the term of this patent is extended or adjusted under 35 U.S.C. 154(b) by 107 days.

(21) Appl. No.: 16/074,634

(22) PCT Filed: Feb. 1, 2017

(86) PCT No.: PCT/IB2017/050536
§ 371 (c)(1),
(2) Date: Aug. 1, 2018

(87) PCT Pub. No.: WO2017/134572
PCT Pub. Date: Aug. 10, 2017

(65) Prior Publication Data
US 2019/0055863 A1 Feb. 21, 2019

(30) Foreign Application Priority Data
Feb. 4, 2016 (IT) .................. 102016000011627

(51) Int. Cl.
F01M 11/03 (2006.01)
F01M 5/00 (2006.01)
(52) U.S. Cl.
CPC ........... *F01M 5/007* (2013.01); *F01M 11/03* (2013.01); *F01M 2011/033* (2013.01)
(58) Field of Classification Search
CPC ... F01M 11/03; F01M 5/007; F01M 2011/033
See application file for complete search history.

(56) References Cited

U.S. PATENT DOCUMENTS 4,512,300 A 4/1985 Devore et al.
2013/0153475 A1* 6/2013 Jainek .................. B01D 35/147
210/149

FOREIGN PATENT DOCUMENTS

DE 10 2010 034788 A1 2/2012
EP 0 295 466 A2 12/1988
(Continued)

OTHER PUBLICATIONS

Giorgio, A Thermostat Valve, Aug. 9, 2011, Full Document (Year: 2011).*

(Continued)

Primary Examiner — Elizabeth J Martin
Assistant Examiner — Nael N Babaa
(74) Attorney, Agent, or Firm — Merchant & Gould P.C.

(57) ABSTRACT

A valve group (10) is housed in a duct (40) of a support body (4) of an oil filtering assembly or a temperature management assembly. The valve group (10) is provided with a valve body (11) fixed to the support body (4), an obturator (15) fitted axially movably on the valve body (11) and obturator positioner and mover (18). The obturator (15) is movable by the obturator positioner and mover (18) as a function of the oil temperature values respectively in a first, a second and a third operating configuration, in which the oil is cooled, heated, for example by a heat exchanger, or sent directly to the filtering device. The obturator (15) is movable by the obturator positioner and mover (18) as a function of the oil pressure values directly to the filtering device, preventing oil access to the heat exchanger.

16 Claims, 19 Drawing Sheets

(56) References Cited

FOREIGN PATENT DOCUMENTS

| EP | 1 752 627 A2 | 2/2007 | |
|---|---|---|---|
| EP | 1 752 628 A1 | 2/2007 | |
| EP | 2 305 360 A1 | 4/2011 | |
| WO | 2012/028914 A1 | 3/2012 | |
| WO | WO-2012028914 A1 * | 3/2012 | ............ F01M 5/007 |

OTHER PUBLICATIONS

International Search Report and Written Opinion of the International Searching Authority for International Patent Application No. PCT/IB2017/050536 dated Jun. 6, 2017, 9 pages.

* cited by examiner

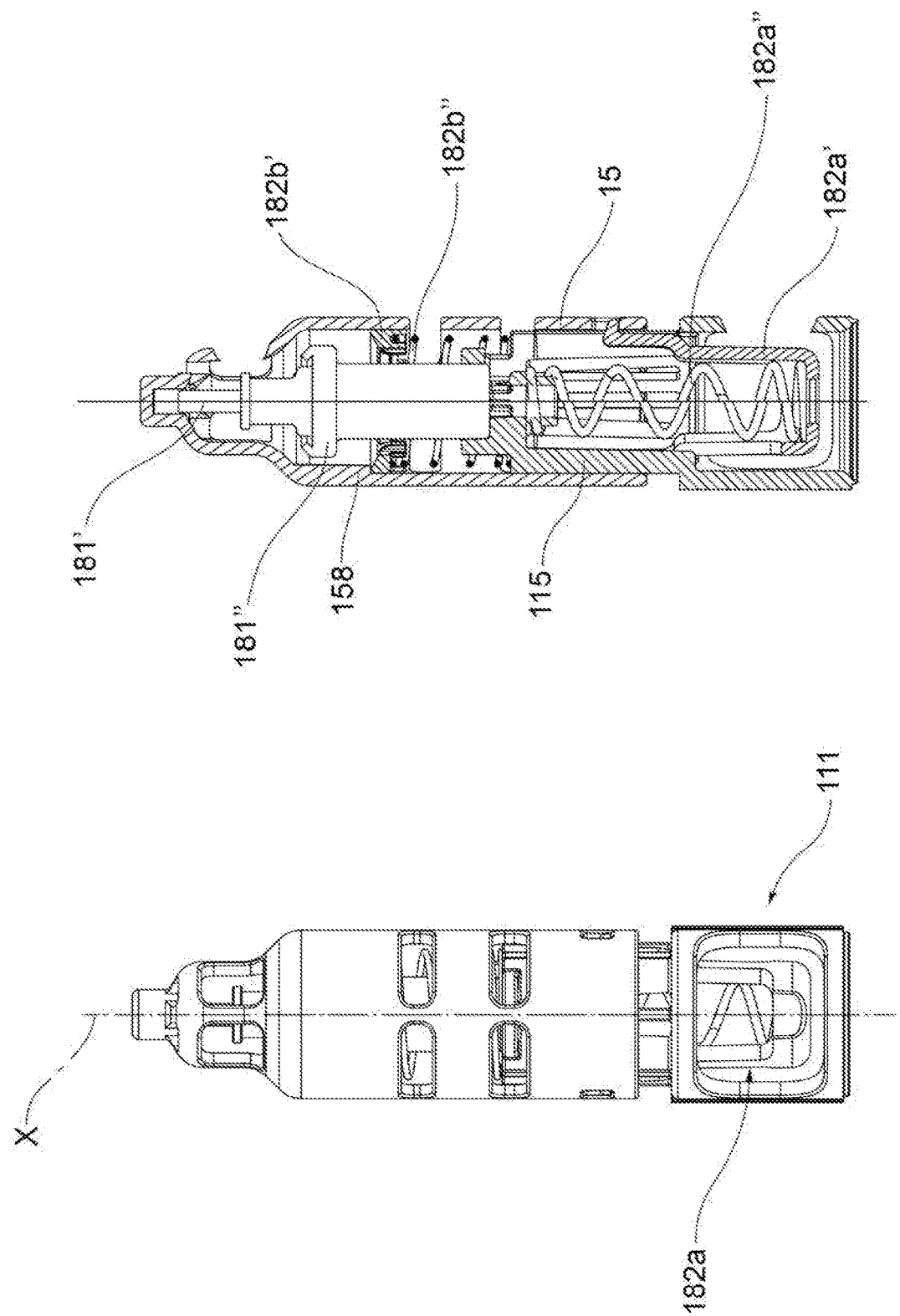

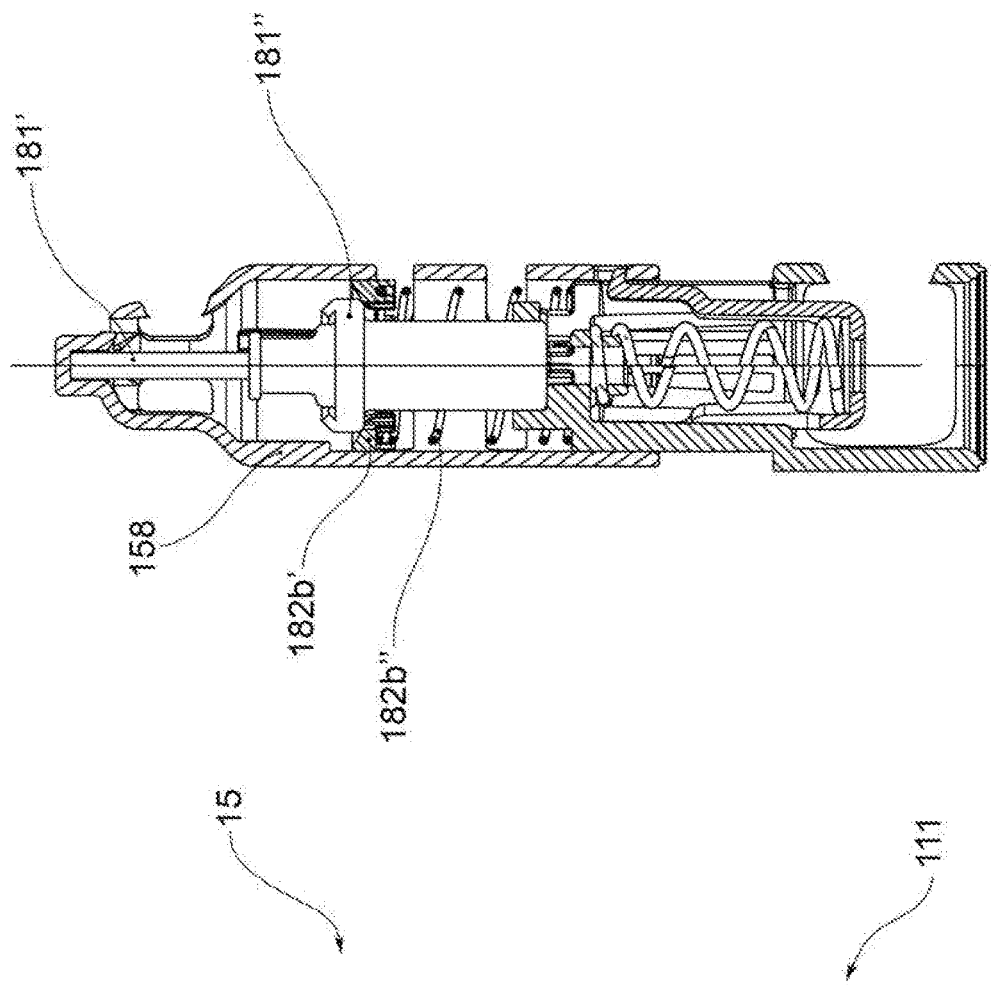
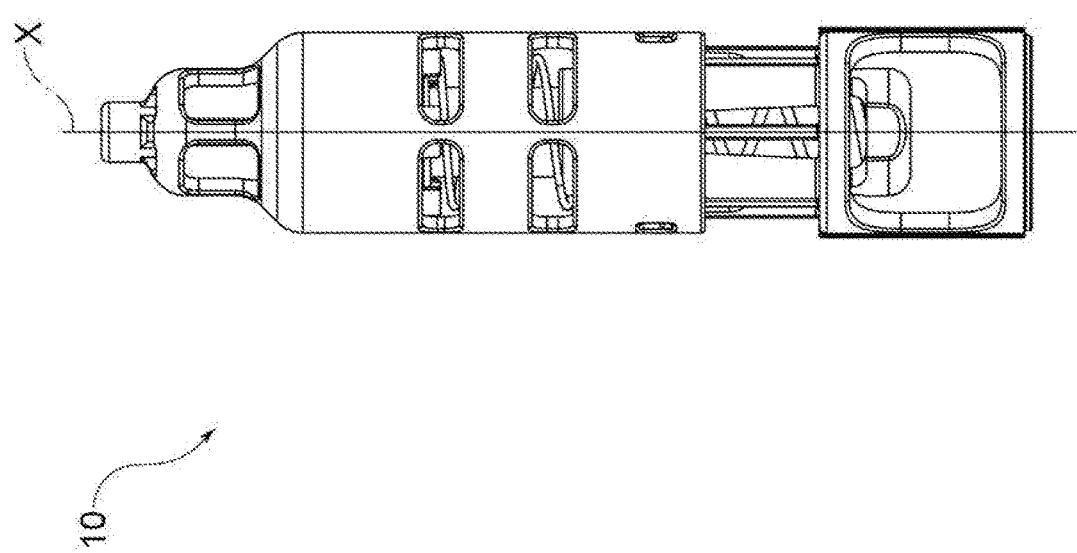
FIG.5b
FIG.5a

VALVE GROUP FOR A PRESSURISED OIL CIRCUIT

This application is a National Stage Application of PCT/IB2017/050536, filed 1 Feb. 2017, which claims benefit of Ser. No. 102016000011627, filed 4 Feb. 2016 in Italy, and which applications are incorporated herein by reference. To the extent appropriate, a claim of priority is made to each of the above-disclosed applications.

FIELD OF APPLICATION

The present invention relates to a valve group for a pressurised oil circuit of a vehicle, an oil filtering assembly for a predefined quantity of oil in the engine of a vehicle comprising such a valve group and an oil temperature management assembly comprising said valve group.

BACKGROUND ART

In a vehicle there are several pressurised oil circuits which are suitable for setting a plurality of components in fluidic communication.

In known circuits, in addition to undergoing the pumping or suction action that sets it in circulation, oil is often subject to other specific operations, such as change of its temperature, or it is filtered and cleaned through special filtering devices.

In particular, pressurised oil circuits are known which comprise a heat exchanger suitable to heat or cool the oil as necessary. Additionally, pressurised oil circuits are known which comprise a filtering device suitable to carry out oil filtering and cleaning operations. Likewise, circuits are known which comprise both these components: for example, specific oil filtering assemblies are known which are suitable to be included in pressurised oil circuits, which comprise at least one heat exchanger and at least one filtering device.

Preferably, such pressurised oil circuits are operationally connected to fundamental and specific components of the vehicle for which the characteristics of the oil are of substantial importance: for example, to the engine assembly or to the gearbox unit (automatic type), or to the transmission unit.

In other words, pressurised oil circuits and/or filtering assemblies are provided in a vehicle which are suitable to operate in different operating conditions depending on the mode of operation of the component to which they are connected, for example according to the modes of operation of the engine.

Namely, known pressurised oil circuits are suitable to cause a change in the oil temperature depending on the needs, for example of the engine: in order to improve the heating step of the engine connected to the circuit, the oil that flows therein is heated, preferably through a heat exchanger. In particular, due to the heat exchange with the second fluid circulating in the exchanger at a temperature higher than the temperature of the oil, the oil temperature is raised to a higher value when it is detected to be too low. Conversely, when the engine operates at high temperatures, and so the oil temperature is too high, the oil is cooled, preferably by heat exchange with the second fluid circulating in the exchanger at a temperature lower than the temperature of the oil, and returned to a lower value or kept within a desired temperature range.

Similarly to the needs of the engine, known pressurised oil circuits are suitable to cause a change in the oil temperature, according to the above, depending on the needs of the gearbox unit or the transmission unit.

In order to manage the oil control towards the heat exchanger or other ancillary components, such as the filtering device, the circuits comprise a valve group suitable to control the passage of fluid in the heat exchanger or directly to the filtering device according to the temperature of the oil.

The solutions of known pressurised circuits and filtering assemblies therefore are particularly complex, specifically in the valve group solution and in its management of the oil flow control.

In addition, known solutions fail to manage any oil pressure peaks, for example coming from the engine. The presence of such pressure peaks is particularly undesirable because it causes accelerated wear of the valve group or other components of the circuit in which the oil flows, for example of the heat exchanger or possibly of the filtering device, thus affecting the useful life of the circuit in its entirety and thus of the interlocked components.

An example of an embodiment of filtering assembly exhibiting such a drawback is shown in document EP1752628.

Solution of the Invention

It is therefore strongly felt the need to provide a valve group that is adapted to ensure an optimal temperature of the oil flowing in the pressurised oil circuit, such as by managing the passage thereof through a heat exchanger, but that at the same time is adapted to solve the above drawback related to the presence of high oil pressure peaks. Likewise, the need to provide an oil filtering assembly is therefore strongly felt which is adapted to ensure an optimal temperature of the oil towards the vehicle engine, such as in input to the filtering device by means of a heat exchanger, but that at the same time is adapted to solve the above drawback related to the presence of high oil pressure peaks. In addition, it is strongly felt the need to provide an oil temperature management assembly which comprises a heat exchanger and a valve group such as to be adapted to ensure an optimal temperature of the oil flowing into the pressurised oil circuit.

DESCRIPTION OF THE DRAWINGS

Further features and advantages of the invention will be made readily apparent from the following description of preferred embodiment examples thereof, provided purely by way of a non-limiting example, with reference to the accompanying figures, in which:

FIG. 1' shows a perspective view with separate parts of a valve group in turn object of the present invention which is housable in the filtering assembly in FIG. 1;

FIGS. 1a and 1b show a front view of the valve group shown in FIG. 1 in a front view and a longitudinal section, respectively;

FIGS. 5a and 5b show a front view of the valve group shown in FIG. 5 in a front view and a longitudinal section, respectively;

DETAILED DESCRIPTION

Figure 1:
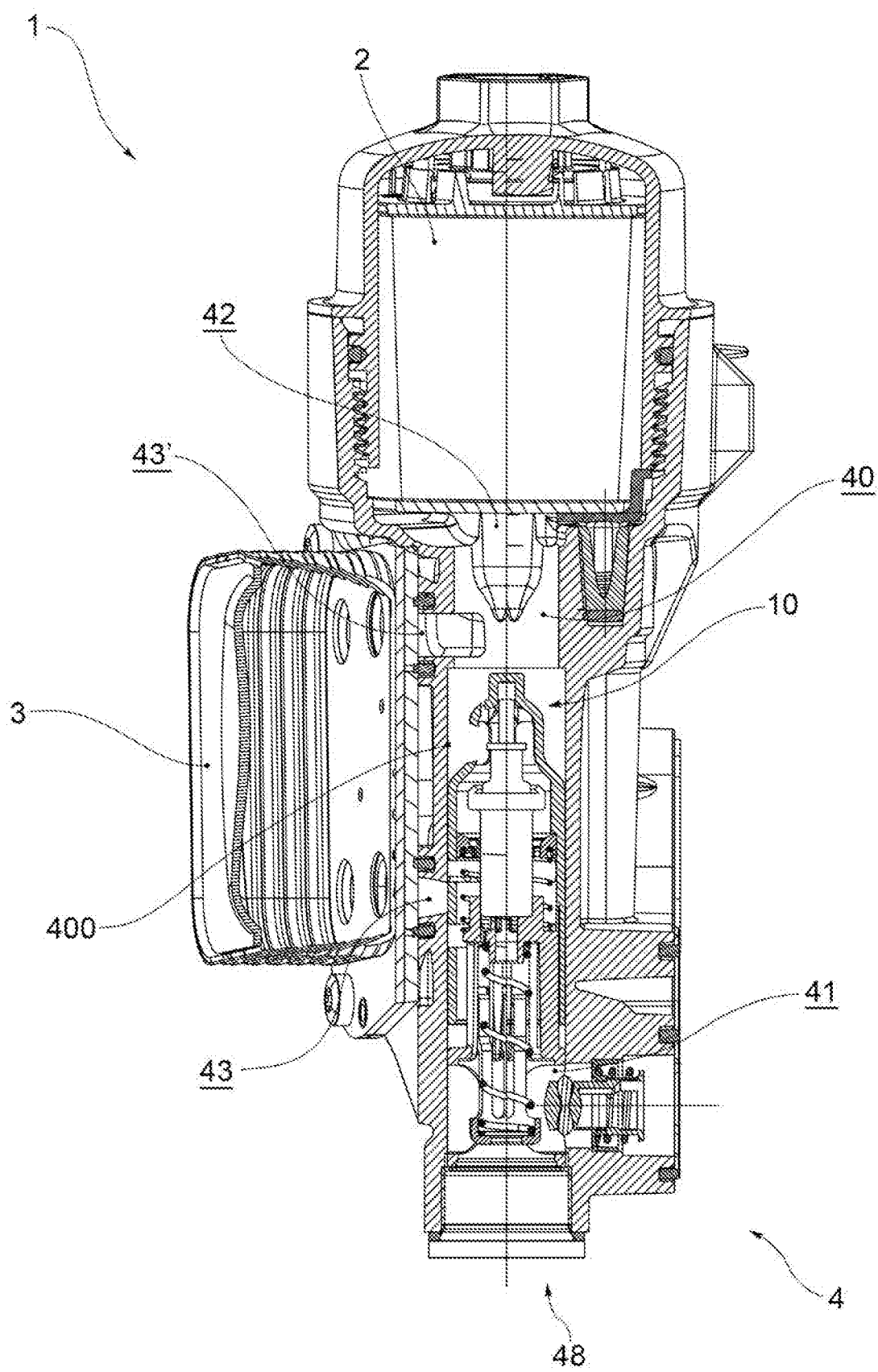
FIG. 1 shows a sectional view of an oil filtering assembly according to a preferred embodiment, wherein the valve group comprised therein is placed in a venting configuration.
Figure 1:
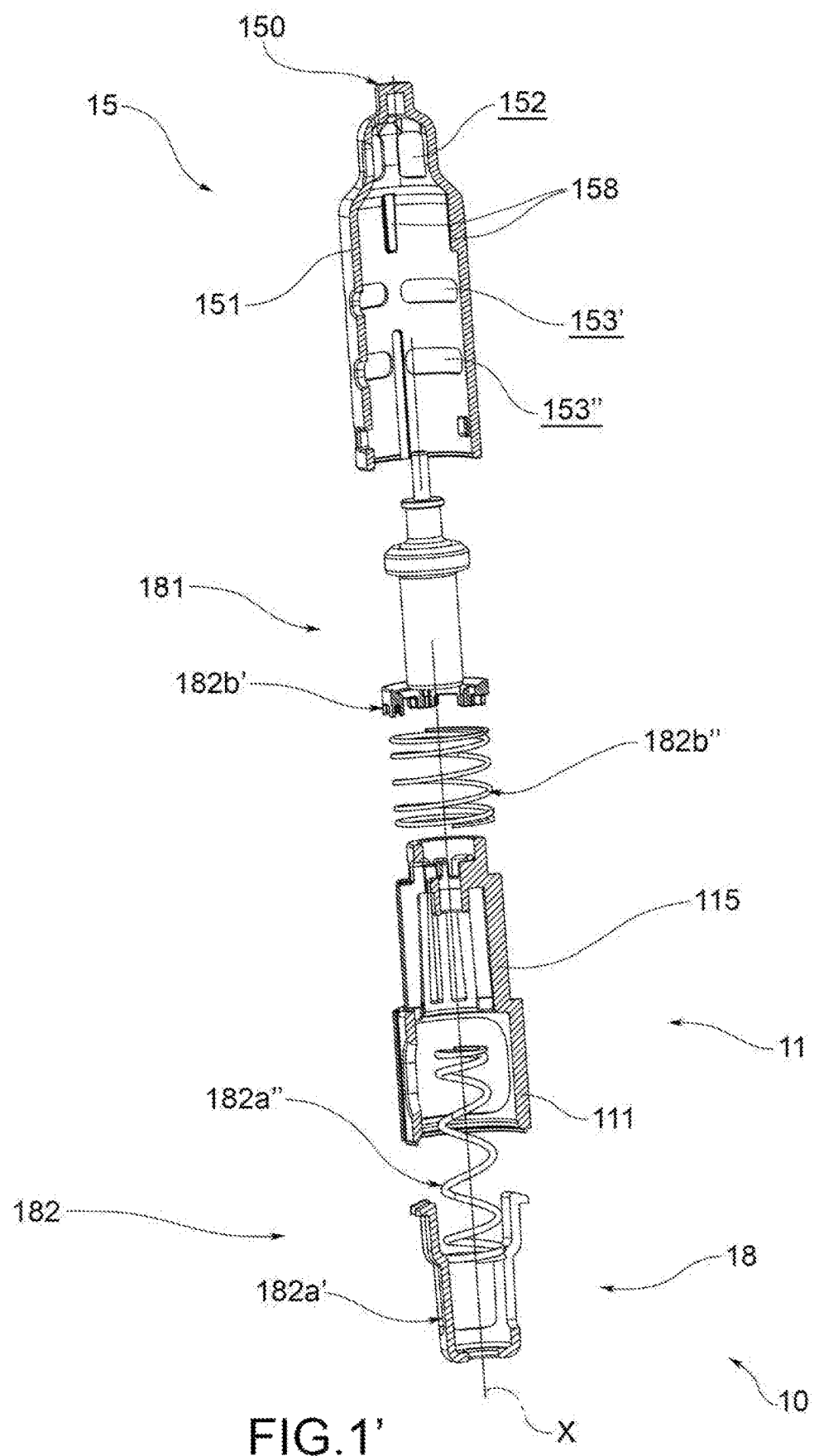

With reference to the accompanying figures, reference numeral 1 indicates an oil filtering assembly for filtering a predefined quantity of oil in the engine of a vehicle. In other words, the filtering assembly 1 is mountable, for example by means of a specially shaped flange, to the engine of a motor vehicle, to be fluidically connected thereto. In further other words, the oil filtering assembly 1 is adapted to be part of a pressurised oil circuit in which a predefined quantity of the engine oil is temperature-adjusted and filtered.

The filtering assembly 1 comprises an oil filtering device 2. In a preferred embodiment, the oil filtering device 2 comprises a filtering partition tubular in shape and two support plates, upper and lower, which are fixed to the opposite ends of the filtering partition.

The filtering assembly 1 comprises a heat exchanger 3. In a preferred embodiment, the heat exchanger 3 is of the type with plates adapted to delimit an alternating succession of passage channels for the coolant (e.g. water) and for the oil, so that the oil in contact with the plates carries out a heat exchange to or from them, increasing or decreasing its temperature.

Moreover, the filtering assembly 1 comprises a support body 4 for the filtering device 2 and the heat exchanger 3. The support body 4 is attachable to the engine, for example by means of a specially shaped flange.

Moreover, the support body 4 comprises at least one duct 40 having at least an inlet mouth 41 through which the oil flows from the engine and at least one outlet mouth 42 through which the oil flows to the filtering device 2. In other words, duct 40 is adapted to receive a predefined quantity of inlet oil coming from the engine to bring it, in output, to the oil filtering device 2. The at least one return duct in turn comprised in the support body 4 which allows the reverse path of the filtered oil from the filtering device to the engine is not an object of the present invention and is not described herein.

Duct 40 has at least one exchanger mouth 43 on the side wall 400 which delimits it through which the oil flows in the heat exchanger 3.

Preferably, moreover, on the side wall 400, duct 40 also has at least one exchanger outlet mouth 43' through which the oil coming from the heat exchanger 3 flows.

In the present description, portions of the duct or components, for example comprised in the valve group described hereinafter, housed therein, close to the inlet mouth 41, are identified as "proximal" while "distal" identifies the portions of the duct or components described hereinafter which are closer to the outlet mouth 42.

Preferably, the exchanger mouth 43 is proximal with respect to the exchanger outlet mouth 43', that is to say, the exchanger mouth 43 is upstream of the exchanger outlet mouth 43'.

According to a preferred embodiment, the oil filtering assembly 1 comprises a valve group 10 housed in duct 40, which extends in length along an axis X-X. Preferably, duct 40 extends at least in its proximal section along said axis X-X so that the side wall 400 has a radial extension with respect to axis X-X.

According to a preferred embodiment, the valve group 10 comprises a valve body 11 which extends along axis X-X axially fixed to the support body 4. Preferably, the valve body 11 is, in fact, adapted to engage the side wall 400 so as to be axially fixed to the support body 4. Preferably, the valve body 11 comprises a locking portion 111 in proximal position adapted to engage the side wall 400 of duct 40, for example with forced coupling.

Moreover, the valve group 10 comprises an obturator 15, which extends along axis X-X fitted, axially movable, on the valve body 11. Preferably, according to the position of obturator 15, the oil is directed towards the oil filtering device 2 or towards the heat exchanger 3.

In a preferred embodiment, obturator 15 has a primary obturator opening 153' and a secondary obturator opening 153" axially spaced from each other through which the oil flows towards the heat exchanger 3 when positioned respectively facing the exchanger mouth 43, in a first operating configuration and a third operating configuration. Moreover, obturator 15 comprises an outlet opening 152 (or a filter opening 152) through which the oil flows towards the filtering device 2, with obturator 2 placed in a second operating configuration and/or in a venting configuration. According to a preferred embodiment, the outlet opening 152 is placed in a distal position, preferably at one end of obturator 15.

Preferably, obturator 15 has a hollow shape, axial-symmetric, having a tip 150 at its end and obturator walls 151 along axis X-X. The outlet opening 152 is thus formed on said tip 150.

In other words, the valve body 11 comprises an obturator portion 115 on which obturator 15 is adapted to be fitted. Preferably, the obturator portion 115 is also adapted to act as a support for obturator 15 in the axial movements thereof; in other words, obturator 15 slides axially on said obturator portion 115, in such a way that the locking portion 111 also performs the function of end of stroke.

Preferably, the valve body 11 is provided internally with a plurality of passages for the oil, in such a way that the oil flows within to the valve body 11, thereby filling the interior of obturator 15 to flow and exit through the above outlets.

According to a preferred embodiment, the valve group 10 comprises obturator positioning and movement means 18 adapted to control the movement of obturator 15 at the occurrence of specific oil conditions. Moreover, the obturator positioning and movement means 18 are adapted to retain or return, as shown hereinafter, obturator 15 in a first operating configuration or basic configuration.

In particular, the obturator positioning and movement means comprise a temperature sensitive device 181 engaging both obturator 15 and the valve body 11, thereby allowing or preventing the passage of oil through the outlet opening 152 or the primary obturator opening 153' or the secondary obturator opening 153", moving obturator 15 as a function of the oil temperature. In other words, as described hereinafter, obturator 15 is engaged by said temperature sensitive device 181 and controlled thereby in a predefined axial position in which the oil flows through the outlet opening 152 or the primary obturator opening 153' or the secondary obturator opening 153".

Moreover, the obturator positioning and movement means 18 comprise a pressure sensitive device 182 adapted to maintain obturator 15 in an axial position corresponding to the first operating configuration and to allow the movement thereof, as a function of the oil pressure, with respect to the temperature sensitive device 181 so as to allow the oil passage through the outlet opening 152. Namely, as described hereinafter, obturator 15 is engaged by said pressure sensitive device 182 in such a manner as to be maintained or returned in the first operating configuration in which the oil flows through the first obturator opening 153'; moreover, the pressure sensitive device is adapted to allow the movement of obturator 15 in a predefined axial position in which the oil flows through the outlet opening 152, in which, in fact, the temperature sensitive device 181 does not engage obturator 15, thereby allowing the oil to flow through the outlet opening 152.

Figure 3:
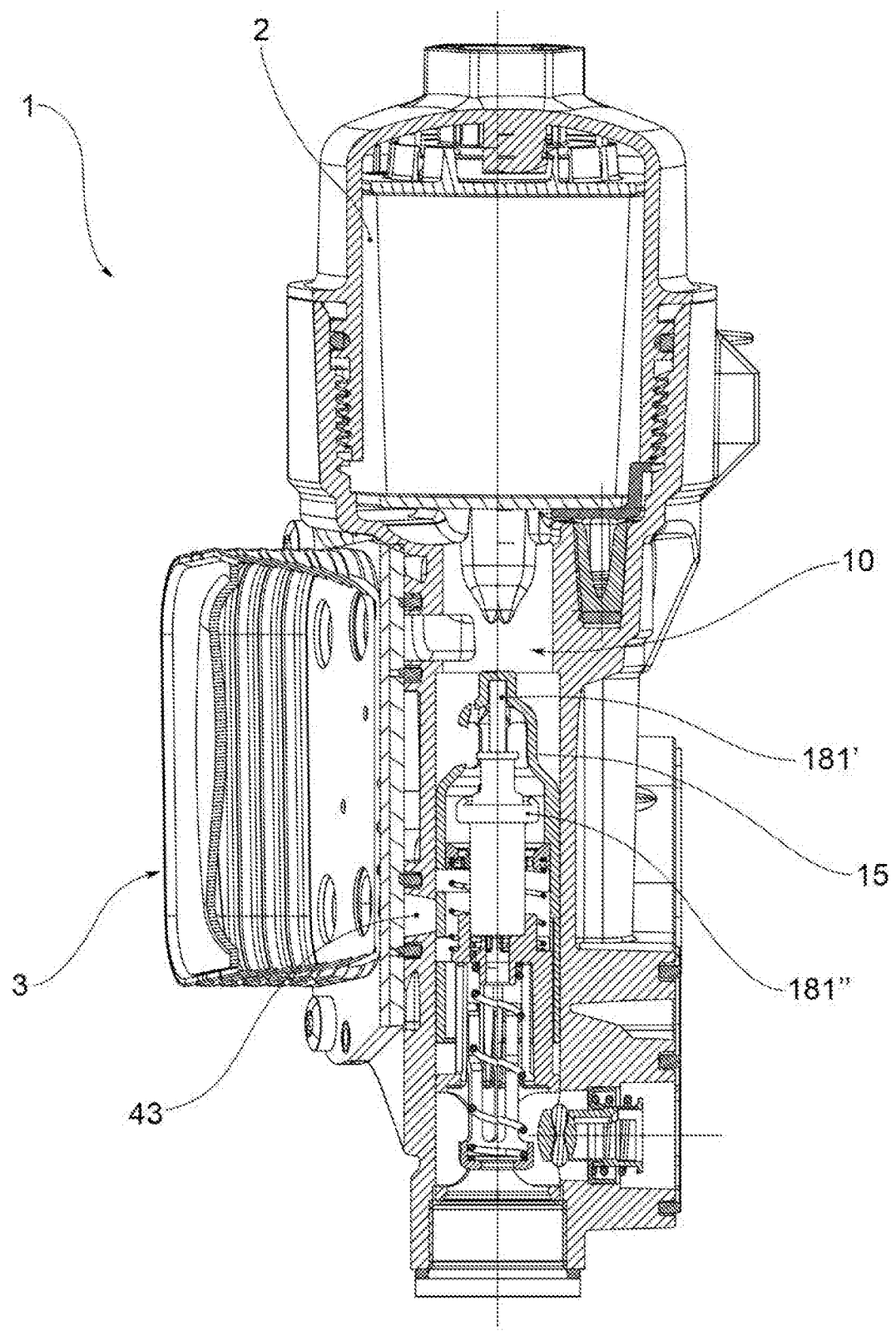
FIG. 3 shows a sectional view of the oil filtering assembly in FIG. 1, wherein the valve group comprised therein is placed in a second operating configuration.
Figure 3B:
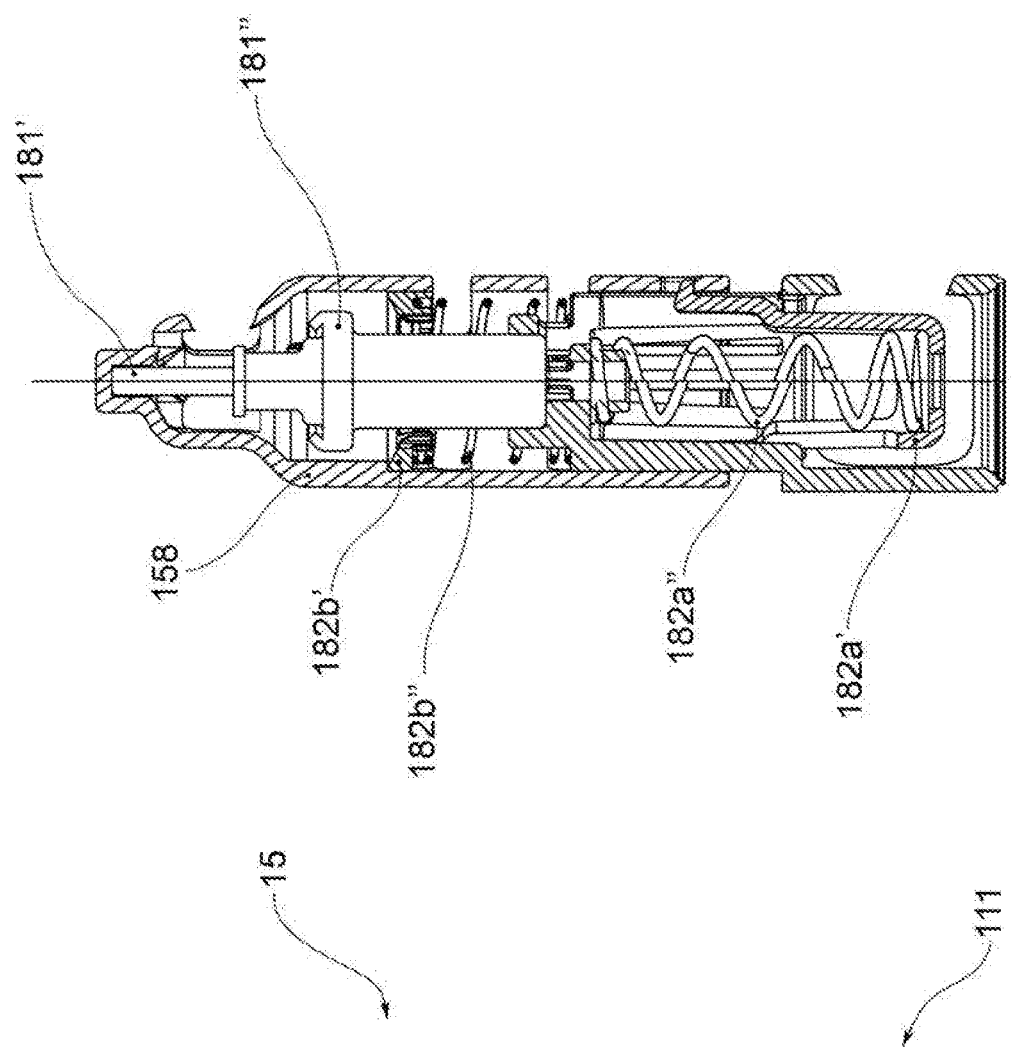
FIGS. 3a and 3b show a front view of the valve group shown in FIG. 3 in a front view and a longitudinal section, respectively.
Figure 3A:
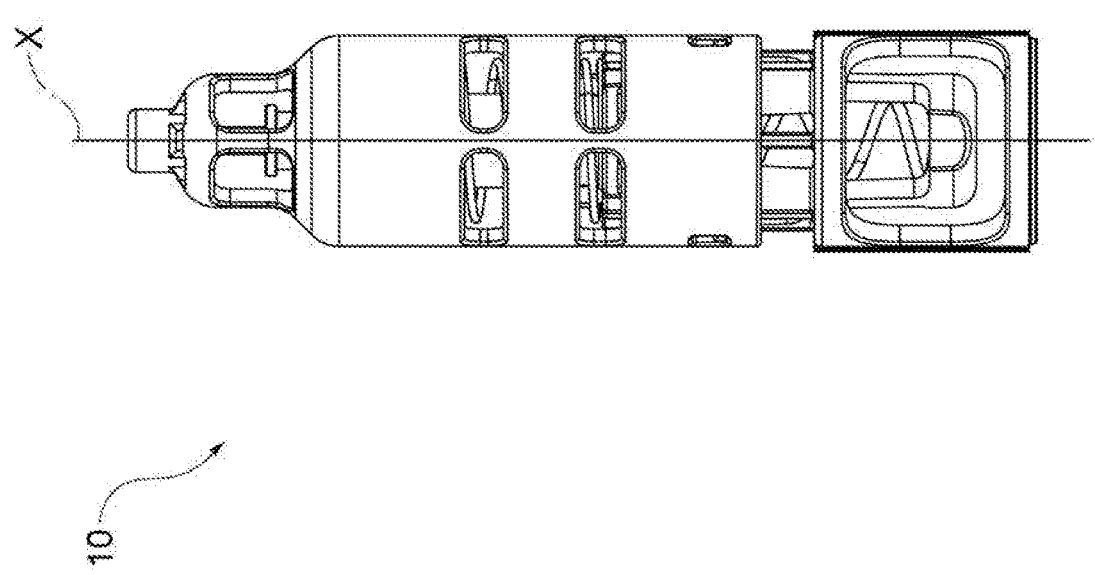
Figure 4:
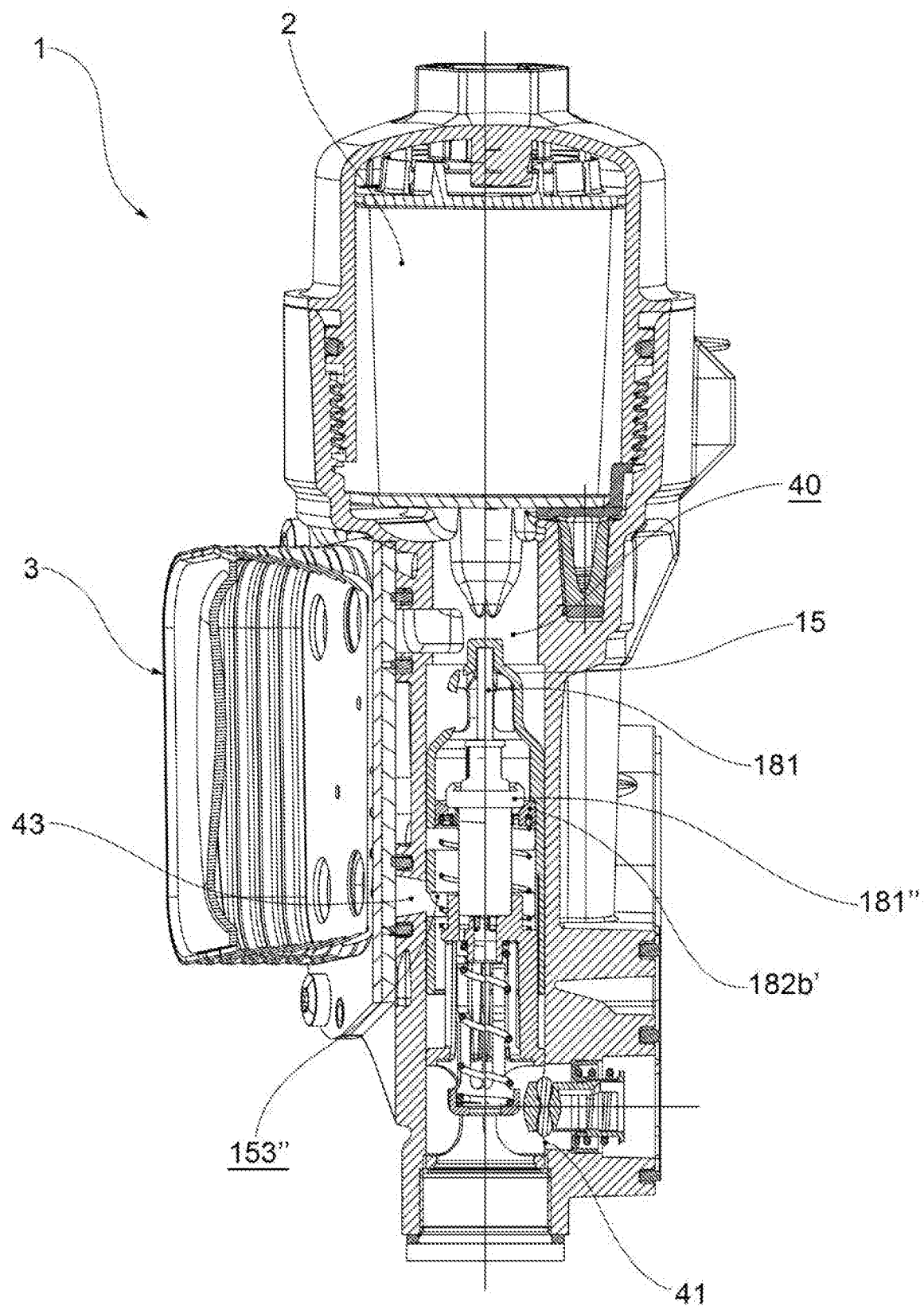
FIG. 4 shows a sectional view of the oil filtering assembly in FIG. 1, wherein the valve group comprised therein is placed in a third minimum operating configuration.
Figure 4B:
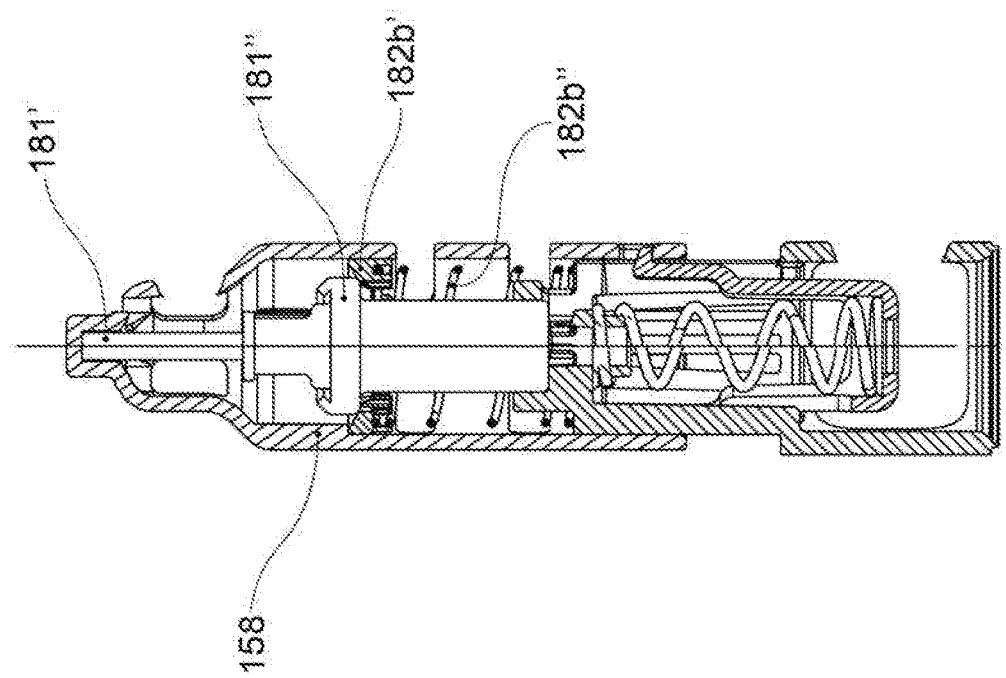
FIGS. 4a and 4b show a front view of the valve group shown in FIG. 4 in a front view and a longitudinal section, respectively.
Figure 4A:
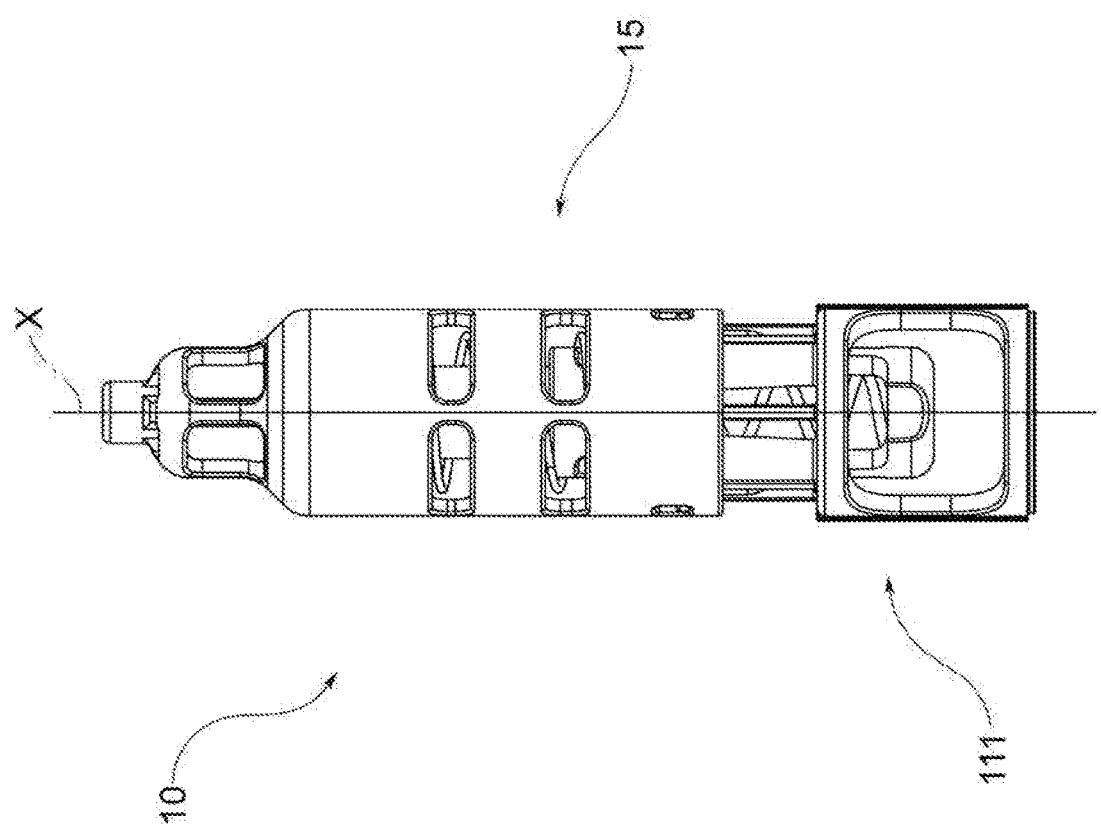
Figure 5:
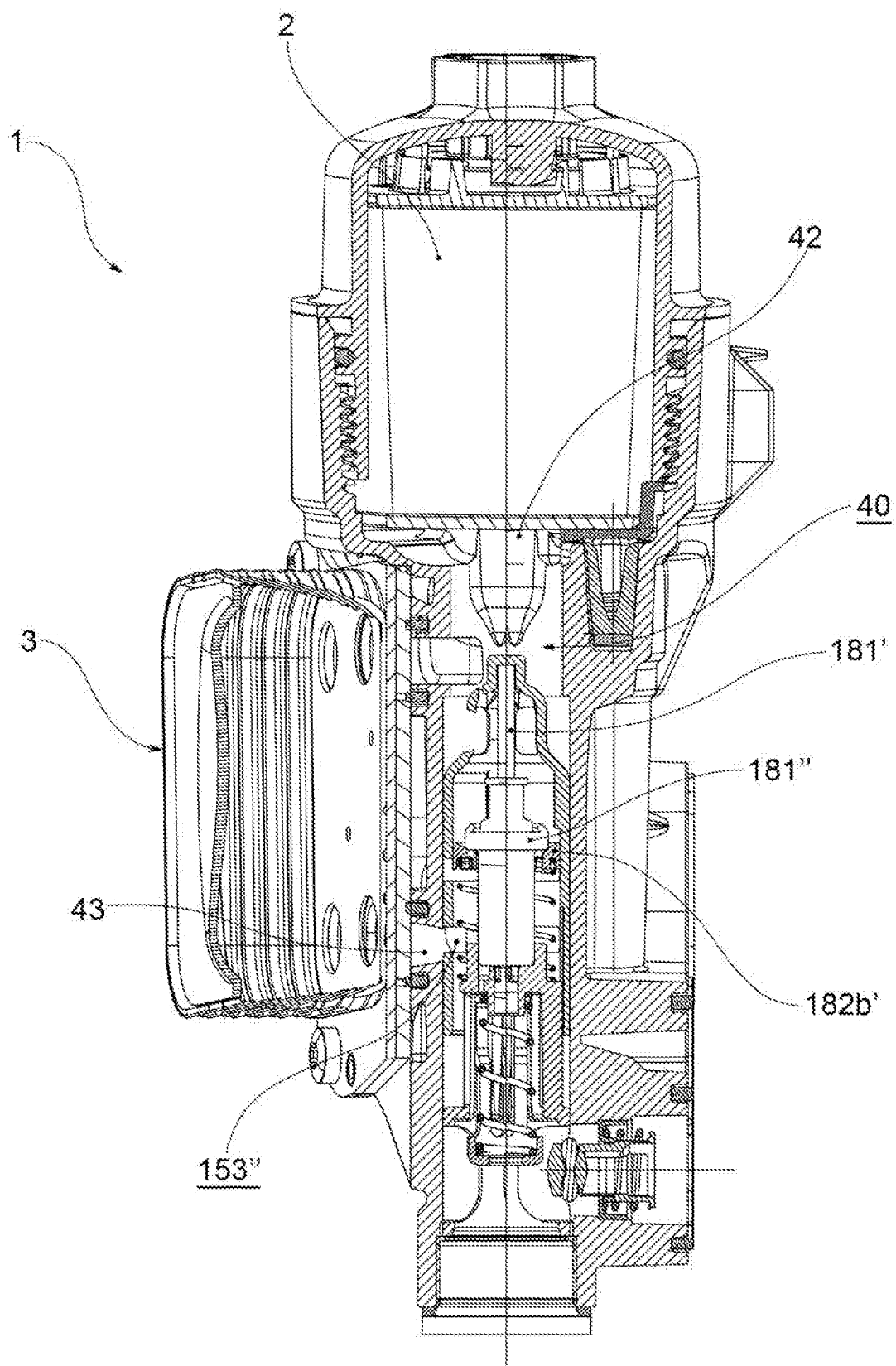
FIG. 5 shows a sectional view of the oil filtering assembly in FIG. 1, wherein the valve group comprised therein is placed in a third maximum operating configuration.

Preferably, due to and by means of, the obturator positioning and movement means 18, obturator 15 is positioned in a plurality of positions corresponding to respective operating configurations of the valve group 10; said configurations comprise:
  a first operating configuration, or basic configuration, or oil heating configuration, in which obturator 15 is in an axial position in which the primary obturator opening 153' is positioned facing the exchanger mouth 43 and the temperature sensitive device 181 engages obturator 15 to prevent the oil passage through the outlet opening 152; preferably, in this configuration, obturator 15 is in a proximal position in abutment on the locking portion 111; preferably, the obturator positioning and movement means 18 are adapted to maintain or return obturator 15 in such a position when it is not moved in the positions described hereinafter (such a configuration is shown in a non-limiting example in FIG. 2);
  a second operating configuration, or configuration with hot oil, in which obturator 15 is in an axial position in which neither the primary obturator opening 153' nor the secondary obturator opening 153" are positioned facing the exchanger mouth 43 (in fact, the wall of obturator 15 is positioned in front of it), in which obturator 15 is spaced apart from the temperature sensitive device 181 in such a manner that the oil flows through the outlet opening 152; preferably, in this configuration, obturator 15 is in a distal position with respect to its axial position of the first operating configuration (such a configuration is shown in a non-limiting example in FIG. 3);
  a third operating configuration, or oil cooling configuration, in which obturator 15 is in an axial position in which the secondary obturator opening 153" is positioned facing the exchanger mouth 43 and the temperature sensitive device 181 engages the pressure sensitive device 182 in such a way as to prevent the oil passage through the outlet opening 152; preferably, in this configuration, obturator 15 is in a distal position with respect to its position of the second operating configuration; preferably, the third operating configuration identifies a third minimum operating configuration, in which the exchanger mouth 43 and the secondary exchanger opening 153" are partially facing, and in a third maximum operating configuration, in which the exchanger mouth 43 and the secondary exchanger opening 153" are fully facing (such configurations are shown in two non-limiting examples in FIGS. 4 and 5);
  a venting configuration, in which due to the pressure sensitive device 182, obturator 15, on the action of the pressurised oil that overcomes the action of said pressure sensitive device 182, is arranged in a distal position in which neither the primary obturator opening 153' nor the secondary obturator opening 153" are positioned facing the exchanger mouth 43 (in fact, the wall of obturator 15 is positioned in front of it), and in which obturator 15 is spaced apart from the temperature sensitive device 181 in such a manner that the oil flows through the outlet opening 152; preferably, in this configuration, obturator 15 is in a distal position with respect to its axial position of the first operating configuration (such a configuration is shown in a non-limiting example in FIG. 1).

Preferably, an oil operating temperature range is identified, delimited by a lower threshold temperature value Tinf and a higher threshold temperature value Tsup. In other words, the oil temperature value measured is lower than the lower threshold temperature value Tinf, comprised within the range of operating temperatures, or greater than the upper threshold temperature value Tsup. Preferably, such a range of operating temperatures is identified as between 95° C. and 125° C., preferably 98° C. and 110° C.

Moreover, an optimal temperature range is also identified in which the oil is at an optimal temperature for the engine operation. Preferably, the optimal temperature range is adjacently higher (greater than the upper threshold temperature value Tsup) than the operating temperature range. For example, preferably, the optimal temperature range has a value of between 125° C. and 150° C.

According to the above, the first operating configuration corresponds to the situation where the oil is at a temperature lower than the temperatures of the operating temperature range, i.e. lower than the lower threshold temperature value Tinf; in such a situation, the oil is forced to flow into the heat exchanger 3 and is heated to be brought to a higher temperature.

If, on the other hand, the oil in duct 40, coming from the engine, is detected by the temperature sensitive device 181 as being at a temperature within said range of operating temperatures, the valve group 10 is placed in the second operating condition, leaving the oil flowing directly towards the outlet opening, downstream of the heat exchanger and then to the engine. Preferably, in such a configuration, the oil passage in the heat exchanger 3 is prevented, thus accelerating the achievement, by the oil, of a temperature having a value that is within the range of temperatures.

The third operating configuration corresponds to the situation where the oil is detected by the temperature sensitive device 181 as being at a higher temperature than the temperature of the range of operating temperatures, i.e. higher than the upper threshold temperature value Tsup, in other words at a temperature within the optimal temperature range. Contrary to the situation in which the oil is at a lower temperature than that defined by the range of operating temperatures, by passing into the heat exchanger 3, the oil is cooled in order to be maintained in such a range of optimal temperatures while avoiding a constant raising thereof of the temperature, thus allowing the engine to continue to operate in an optimal condition.

Preferably, transient operating temperature ranges are also identified, which correspond to mixed configurations, in which a quantity of oil flows through the primary obturator opening 153' or the secondary obturator opening 153" towards the heat exchanger 3, while the remaining quantity of oil flows through the outlet opening 152, towards the filtering device 2. For example, a transient configuration, in which obturator 15 is axially placed so that the oil flows through both the primary obturator opening 153' and the outlet opening 152 occurs at an oil temperature ranging between 85° C. and 95° C.-98° C. Or by way of example, a second transient configuration, in which obturator 15 is axially placed so that the oil flows through both the secondary obturator opening 153" and the outlet opening 152, occurs at an oil temperature of between 110° C.-115° C. and 125° C.

Figure 6:
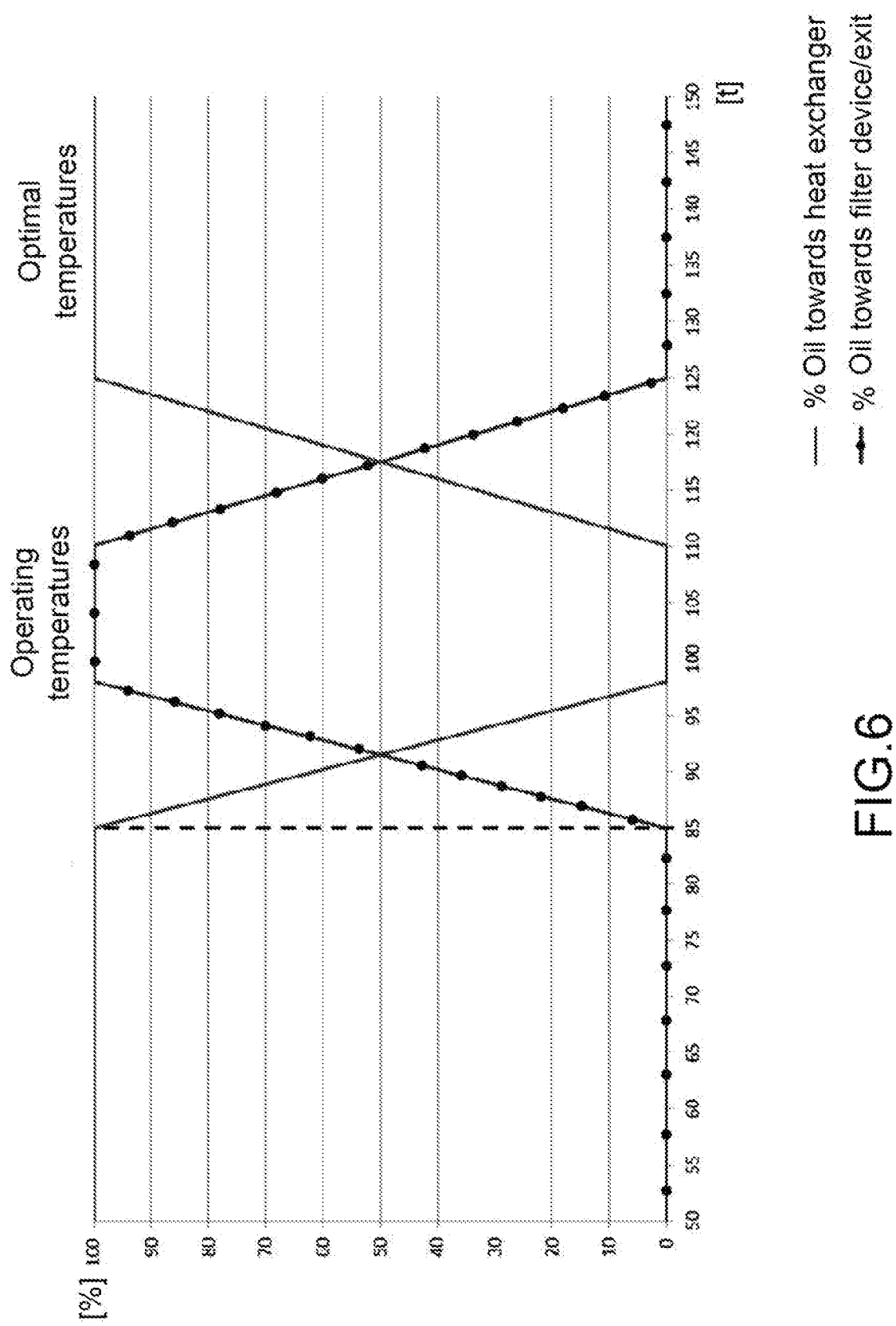
FIG. 6 shows a diagram showing the percentage amount of oil that in the oil filtering assembly flows towards the heat exchanger or towards the filtering device according to the temperature detected by the temperature sensitive device comprised in the valve group, applied to small-sized motor vehicles.
Figure 7:
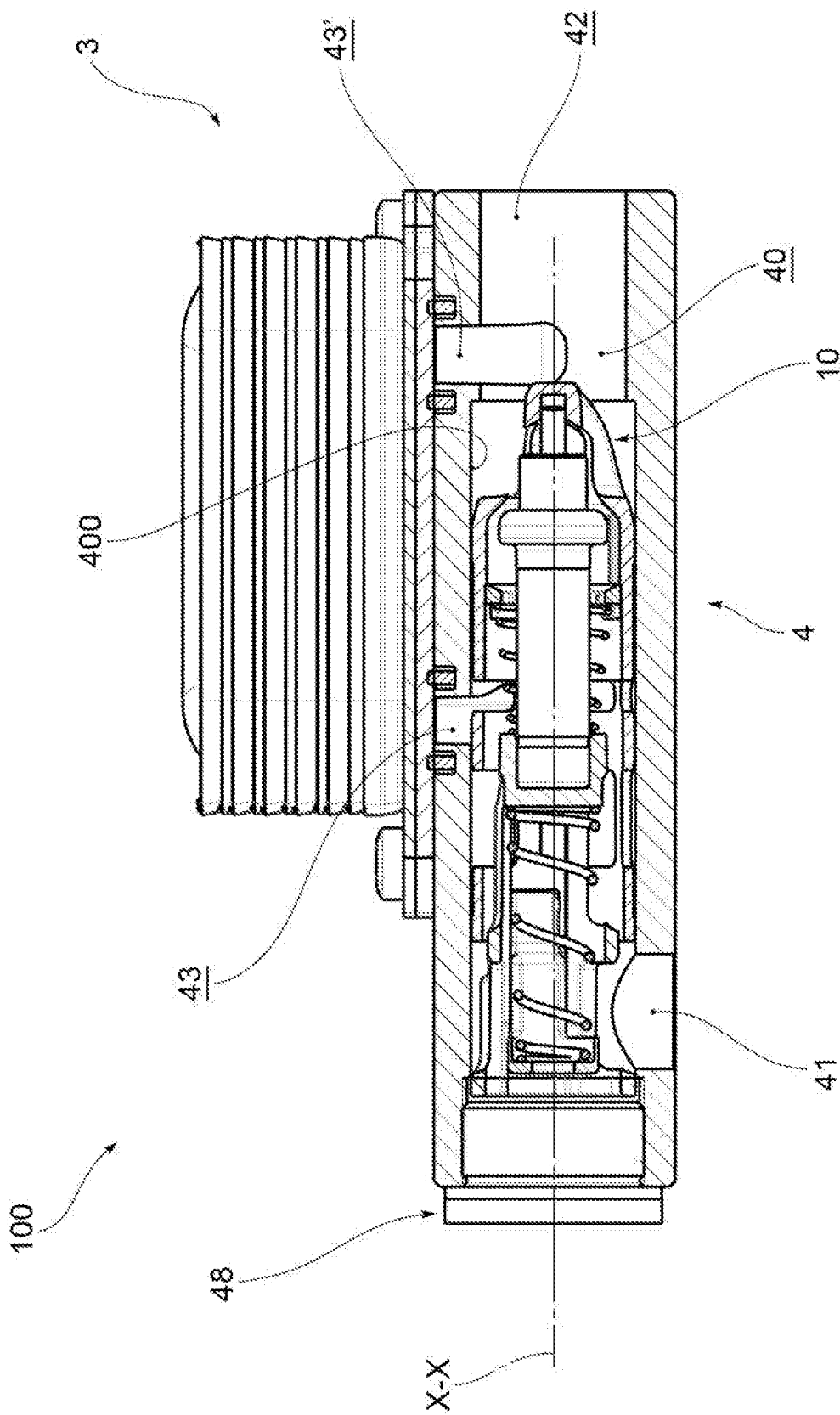
FIG. 7 shows a sectional view of a temperature adjustment assembly according to a preferred embodiment, comprising a valve group placed in a venting configuration.
Figure 8:
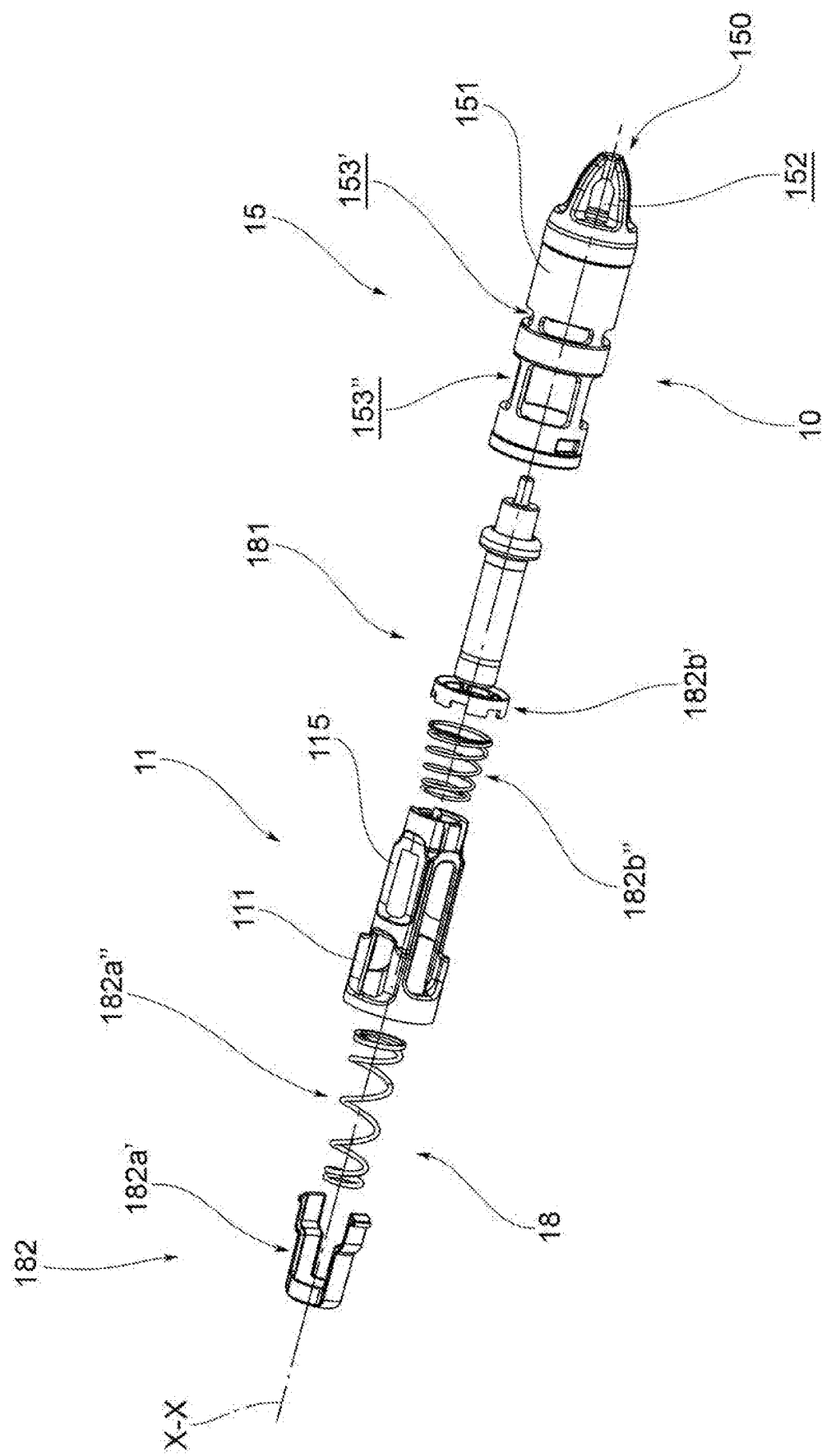
FIG. 8 shows a perspective view with separate parts of a valve group according to a further embodiment, in turn object of the present invention.
Figure 8A:
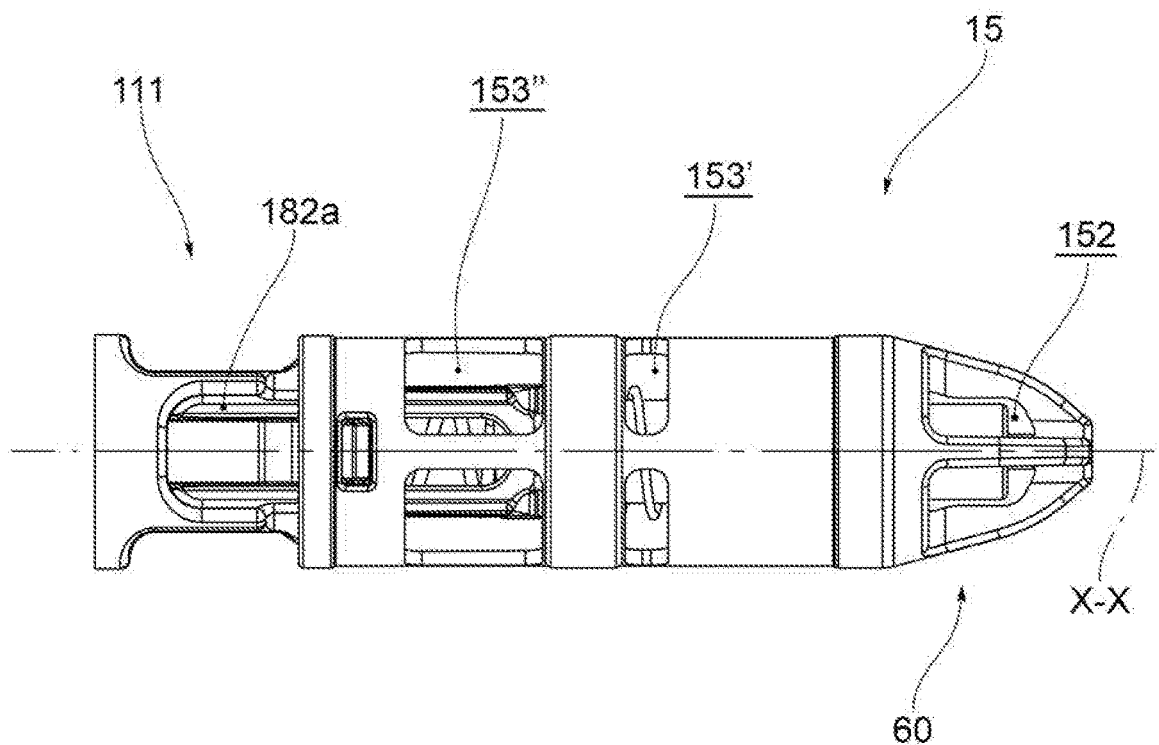
FIGS. 8a and 8b show a front view of the valve group shown in FIG. 7 in a front view and a longitudinal section, respectively.
Figure 8B:
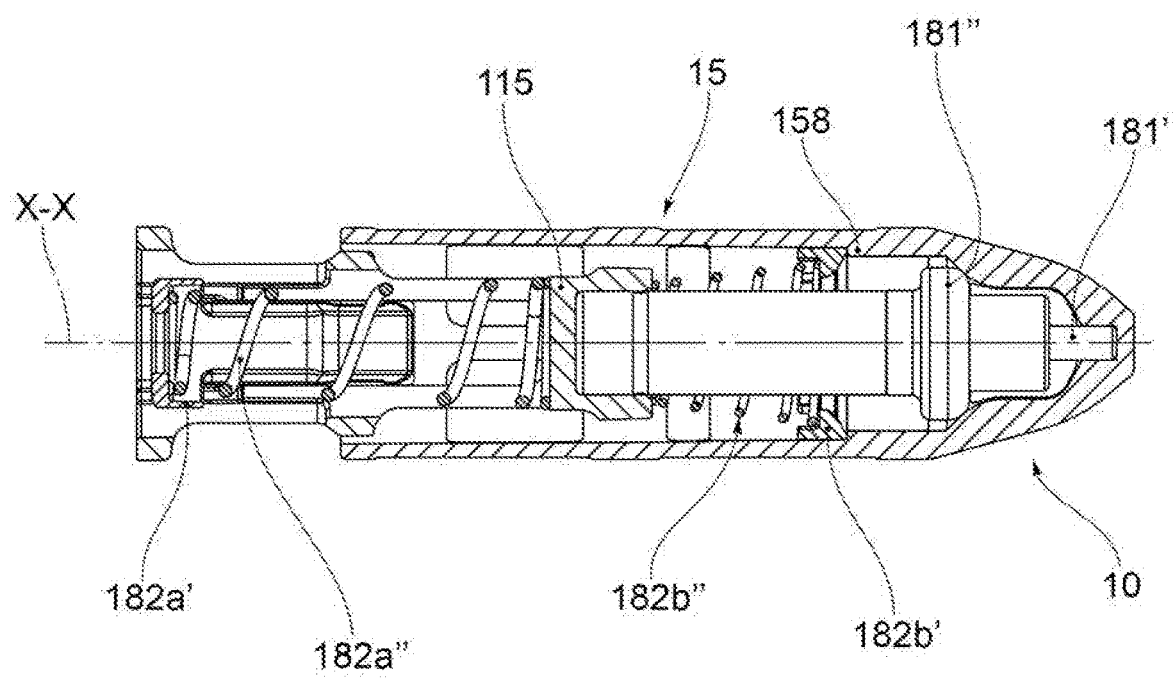
Figure 9:
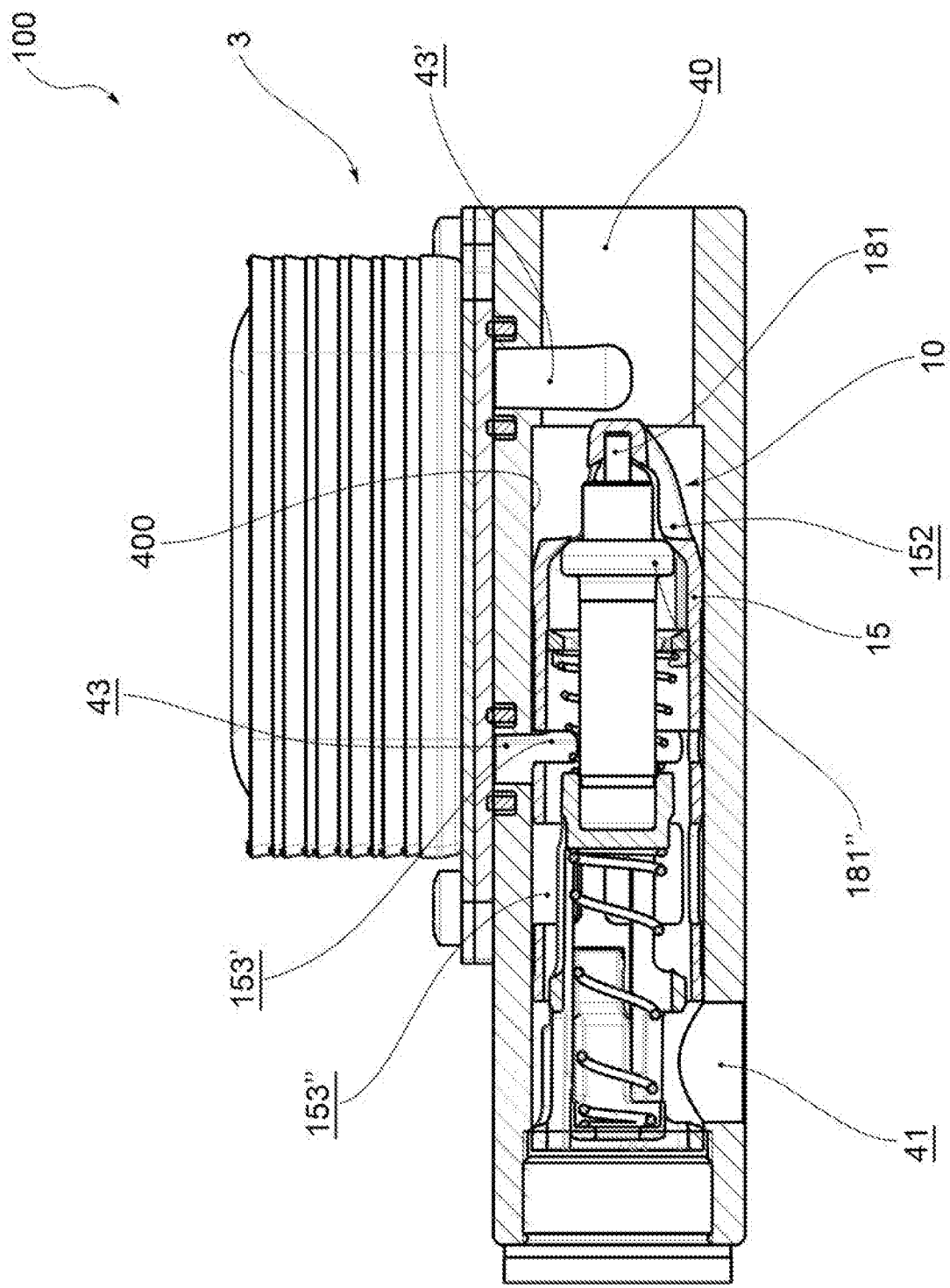
FIG. 9 shows a sectional view of the temperature adjustment assembly in FIG. 7, wherein the valve group comprised therein is placed in a first operating configuration.
Figure 10:
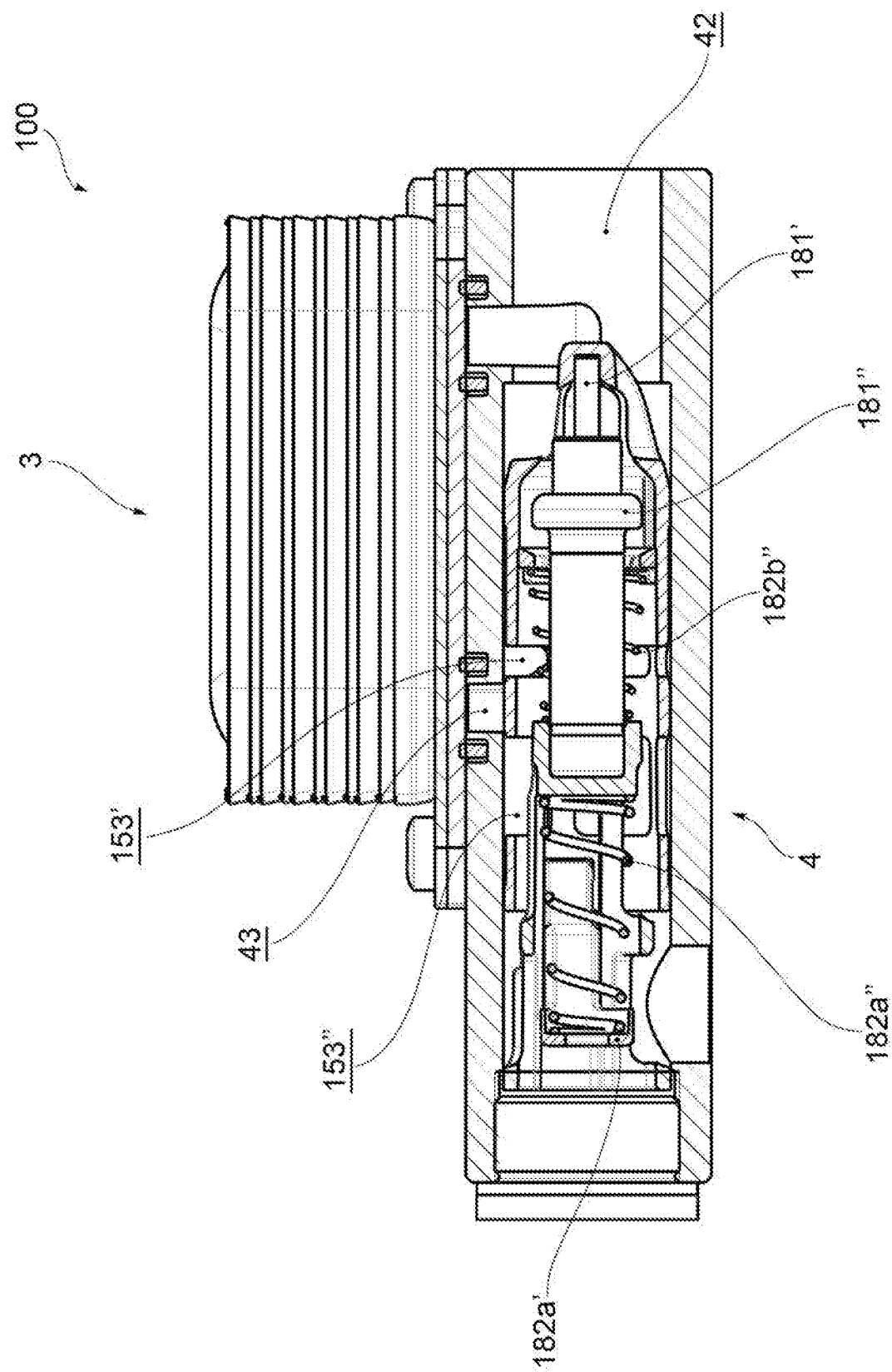
FIG. 10 shows a sectional view of the temperature adjustment assembly in FIG. 7, wherein the valve group comprised therein is placed in a second operating configuration.
Figure 11:
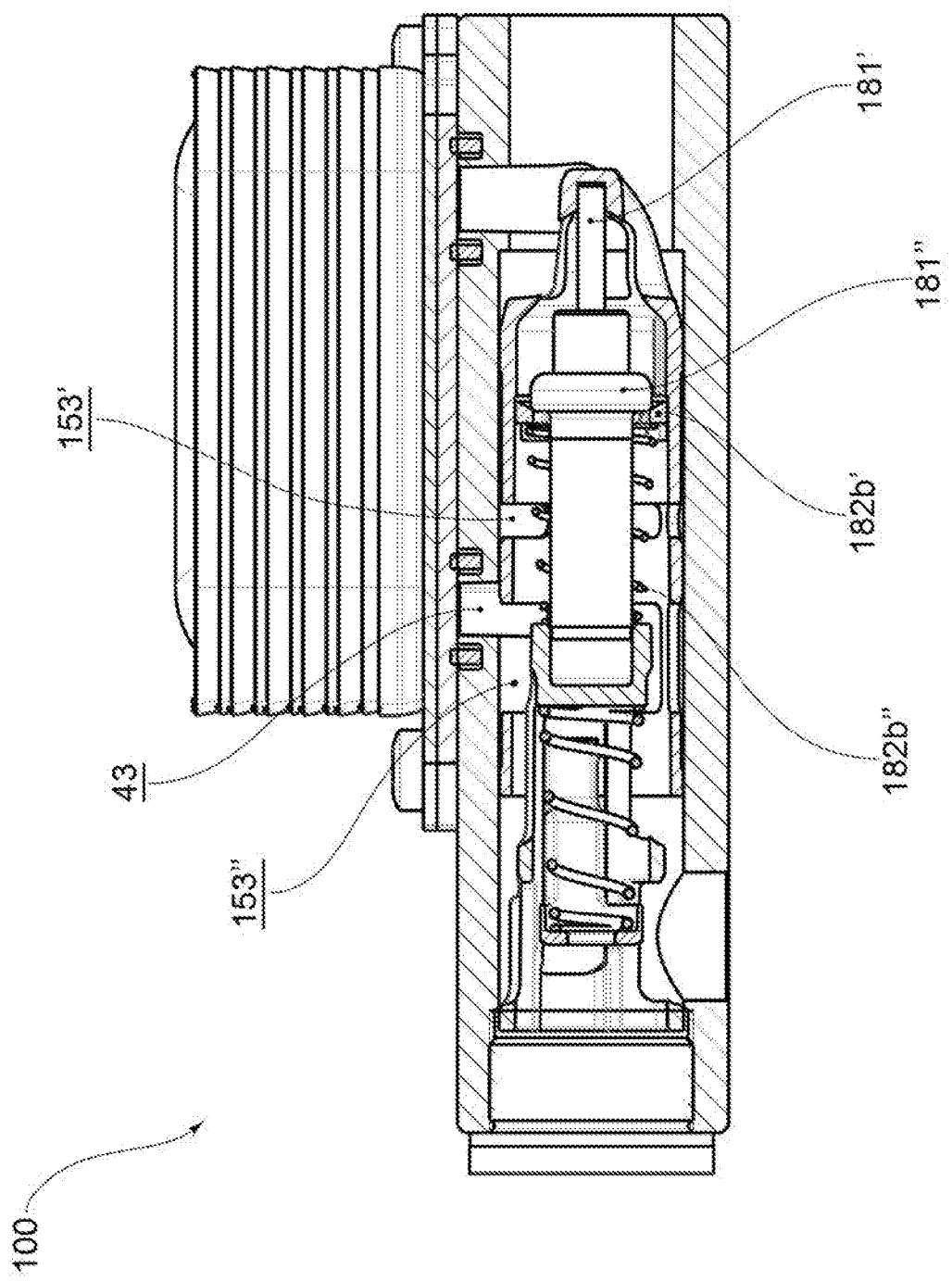
FIG. 11 shows a sectional view of the temperature adjustment assembly in FIG. 7, wherein the valve group comprised therein is placed in a third minimum operating configuration.
Figure 12:
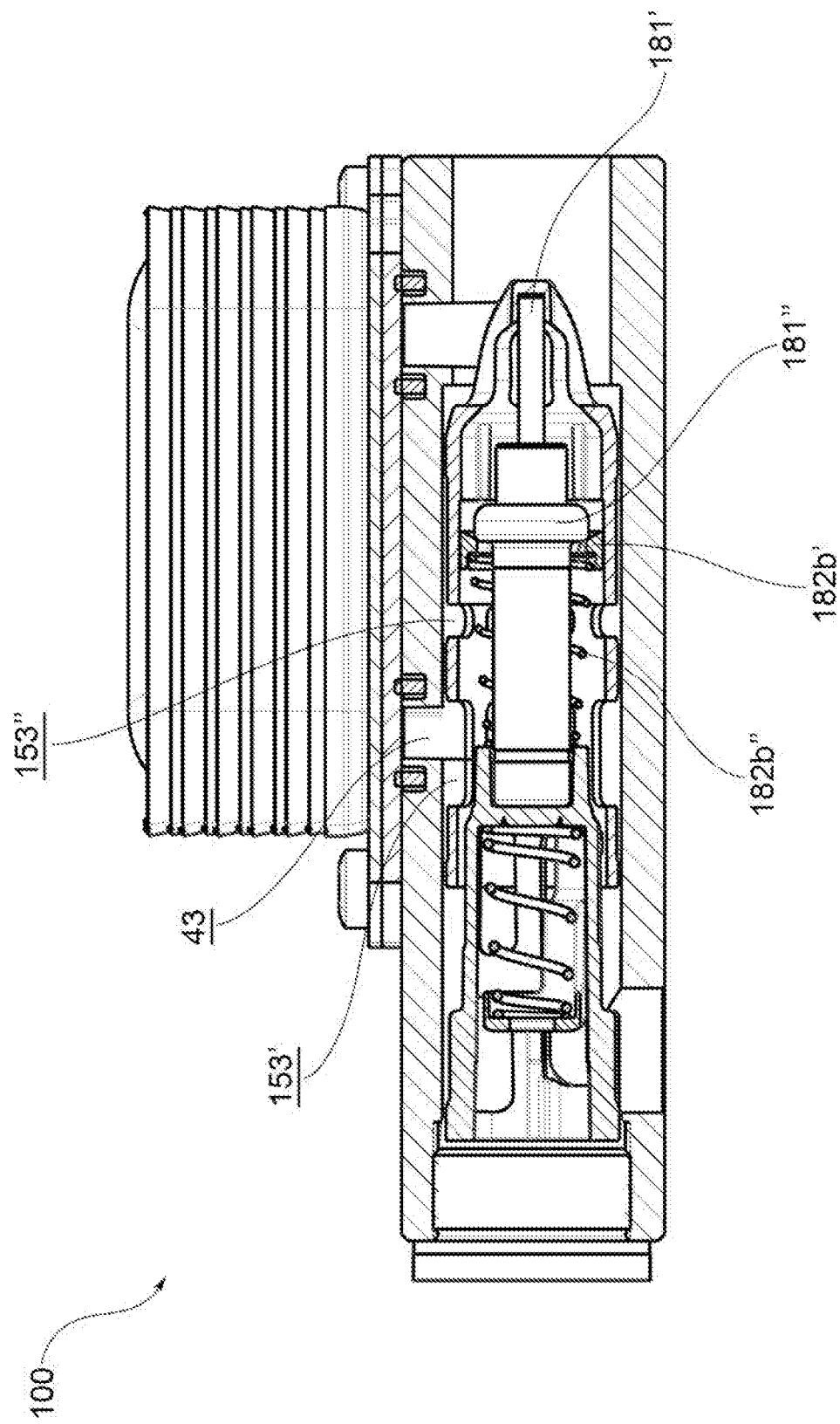
FIG. 12 shows a sectional view of the oil filtering assembly in FIG. 7, wherein the valve group comprised therein is placed in a third maximum operating configuration.

FIG. 6 shows the graph of the quantity (as a percentage) of oil that flows towards the heat exchanger or through the outlet opening (downstream of heat exchanger 3) such as, for example, towards the filtering device 2, as a function of its temperature. The above temperatures and the above temperature ranges as well as FIG. 6, relate to specific automotive applications for motor vehicles, typically of medium size, in fact these temperature values for industrial vehicles tend to be lower than those cited above.

According to a preferred embodiment, excessive oil pressure peaks, typically found at a cold temperature, i.e. lower than the lower threshold temperature value, may correspond to a potential damage to the valve group 10 and/or the heat exchanger 3, if the oil flows towards it.

Using the pressure sensitive device 182, however, under the action of a pressure peak obturator 15 is moved axially to the venting configuration so that the oil flows towards the outlet opening 152 and the pressure action is not released on the valve group 10 and/or the heat exchanger 3. Preferably, therefore, a threshold pressure value is defined above which the movement of obturator 15 is induced; for example, such a threshold pressure value is 2 bar.

According to a preferred embodiment, the temperature sensitive device 181 is housed on the valve body 11, preferably on the distal end of the obturator portion 115.

Preferably, the temperature sensitive device 181 distally comprises a control portion 181' engaging obturator 15, which changes its shape along axis X-X depending on the oil temperature. Preferably, the control portion 181' lies on axis X-X and engages obturator 15 at the centre of tip 150 thereof.

According to a preferred embodiment, the temperature sensitive device 181 contains a wax body of changeable shape, preferably adapted to change the height of the control portion 181'.

Preferably, moreover, the temperature sensitive device 181 comprises a stopper protrusion 181" suitable to engage obturator 15 in the first operating configuration and to engage the pressure sensitive device 182 in the third operating configuration, thereby preventing the passage of oil towards the outlet opening 152.

In other words, the stopper protrusion 181" has a radial extension. Preferably, the stopper protrusion 181" has axial-symmetric shape. Preferably, the stopper protrusion 181" is a radial ring adapted to distally engage obturator 15 (at its interior) for example close to tip 150, and adapted to proximally engage the pressure sensitive device 182 described hereinafter, thereby obstructing the passage of the oil flow towards the outlet opening 152.

According to a preferred embodiment, the pressure sensitive device 182 works with the valve body 11, with obturator 15 and with the temperature sensitive device 181.

Preferably, the pressure sensitive device 182 comprises engagement means 182a, for example housed in a proximal position, engaging the valve body 11 and obturator 15 to keep obturator 15 in the first operating configuration, and allow the movement of obturator 15 into the venting configuration when stressed by the action of the pressurised oil.

Preferably, the retention means 182a comprise a retention portion 182a' integrally connected to obturator 15 and an elastic retention body 182a" placed between the retention portion 182a' and the valve body 11 so as to exert upon them an axial thrust action in the proximal direction.

According to a preferred embodiment, the retention portion 182a' is fixed snap-wise to obturator 15, for example to the obturator wall 151 in its proximal end opposite to the obturator 15 tip.

In a preferred form of embodiment, the retention means 182a are adapted to extend along axis X-X, so as to house in the base portion 111, in the first operating configuration.

According to a preferred embodiment, said elastic retention body 182a" is a helical spring operating between the retention portion 182a' and the valve body 11. Preferably, the retention portion 182a' has a substantially hollow or U or C shape, in such a way that it engages obturator 15 by its arms and is shaped for housing the elastic retention body 182a" at its interior.

According to a preferred embodiment, moreover, the pressure sensitive device 182 comprises engagement means 182b, preferably housed in a distal position, engaging the valve body 11 and obturator 15 and/or the temperature sensitive device 181 to keep obturator 15 in the third operating configuration, and permit the movement of the obturator into the venting configuration when stressed by the action of the pressurised oil, for example higher than the threshold pressure value.

Preferably, in fact, the engagement means 182b comprise an abutment element 182b' suitable to engage obturator 15 and/or the temperature sensitive device 18 and an elastic thrust body 182b" placed between the abutment element 182b' and the valve body 11, wherein the elastic thrust body 182b" is adapted to perform on them an axial thrust action in the distal direction.

In other words, the engagement means 182b operate in the opposite direction with respect to the holding retention means 182a.

Therefore, if the oil pressure has value greater than a predefined threshold pressure value, in other words has an overpressure value, obturator 15 undergoes the action of the elastic thrust body 182" and of said pressure, thus overcoming the thrust action of the elastic retention body 182a" which is then axially compressed.

In other words, also the engagement means 182b are in turn subject to the pressure action, in fact if the oil pressure has value greater than the threshold pressure value, obturator 15 under the oil action moves axially, pushed by the retention body 182b' in turn pushed by the elastic thrust body 182b" which thus is axially stretched.

Preferably, the abutment element 182b' has substantially axial-symmetric shape, for example as a ring, with respect to axis X-X in a manner such that it is adapted, in the first operating configuration, in the second operating configuration and in the venting configuration to externally engage the obturator wall 151 which comprises a special abutment step 158. While in the third operating configuration, the abutment element 182b' is shaped so as to be internally engageable by the temperature sensitive device 181, in particular by the stopper protrusion 181".

According to a preferred embodiment, the elastic thrust body 182b" is a helical spring operating between the abutment element 182b' and the valve body 11.

Figure 2:
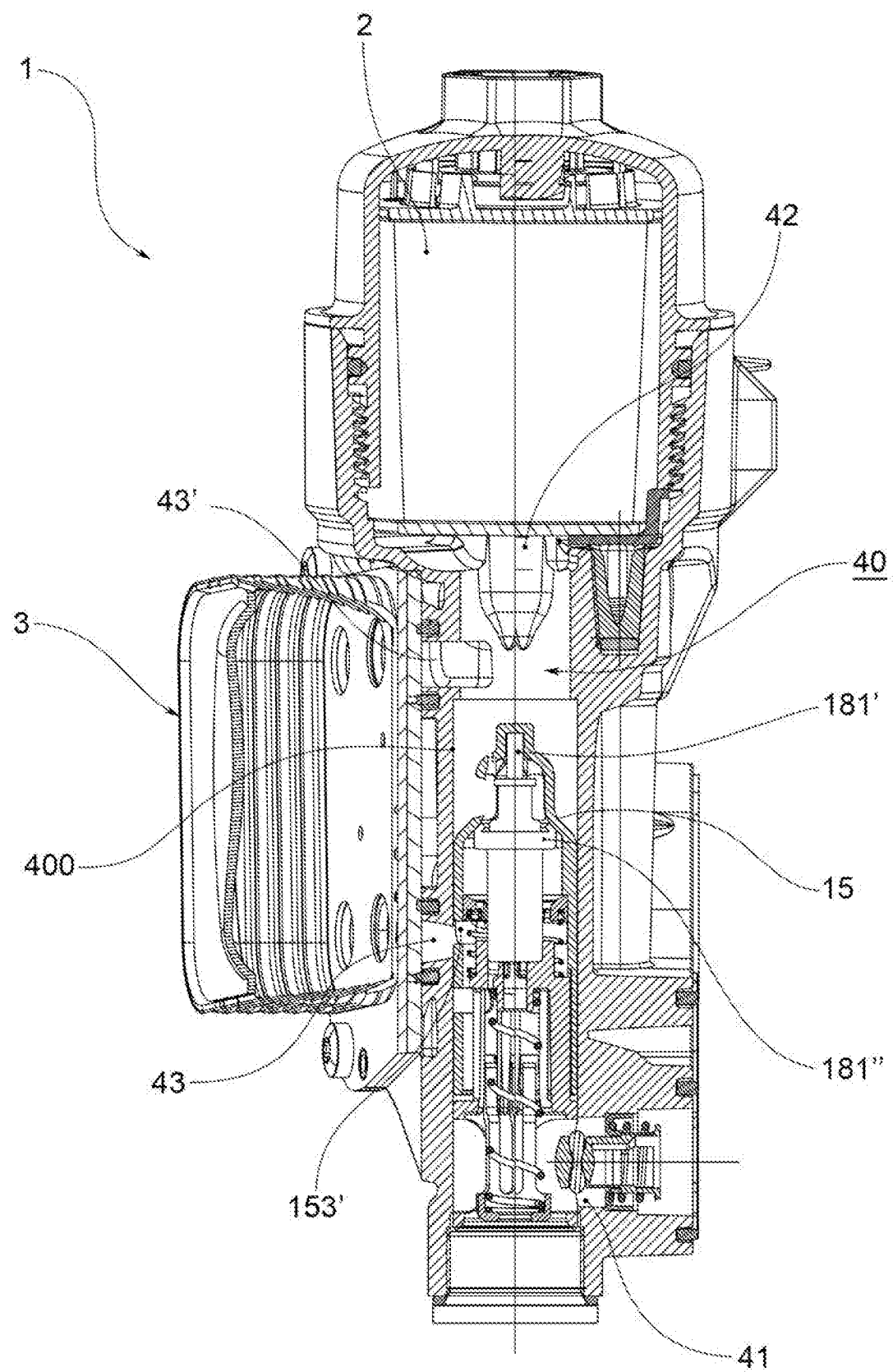
FIG. 2 shows a sectional view of the oil filtering assembly in FIG. 1, wherein the valve group comprised therein is placed in a first operating configuration.
Figure 2B:
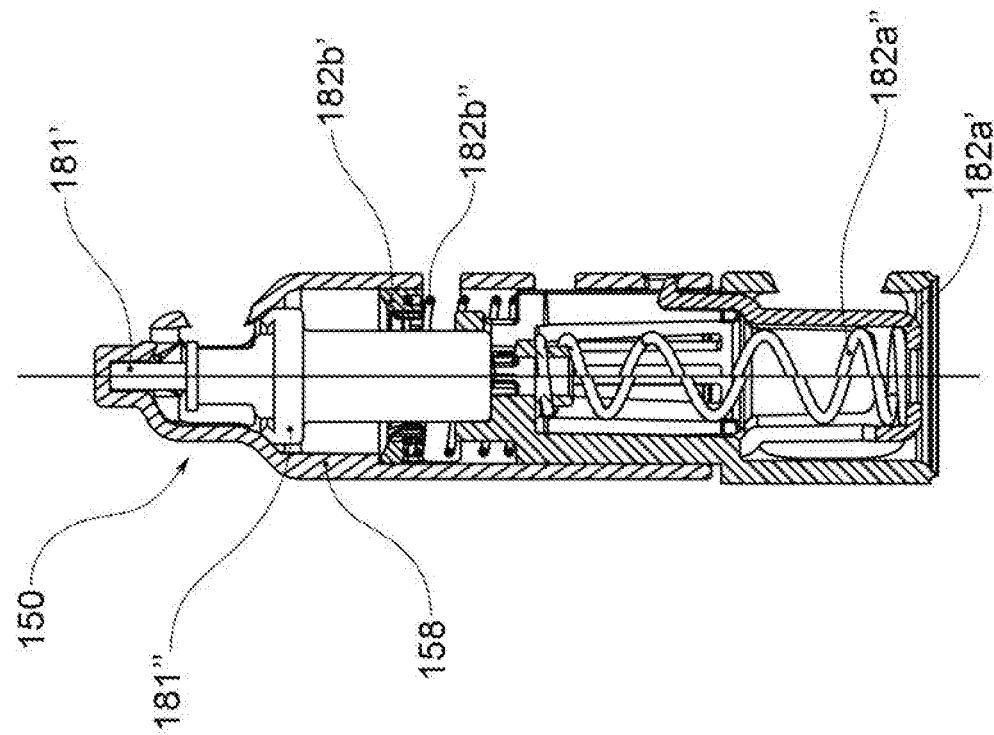
FIGS. 2a and 2b show a front view of the valve group shown in FIG. 2 in a front view and a longitudinal section, respectively.
Figure 2A:
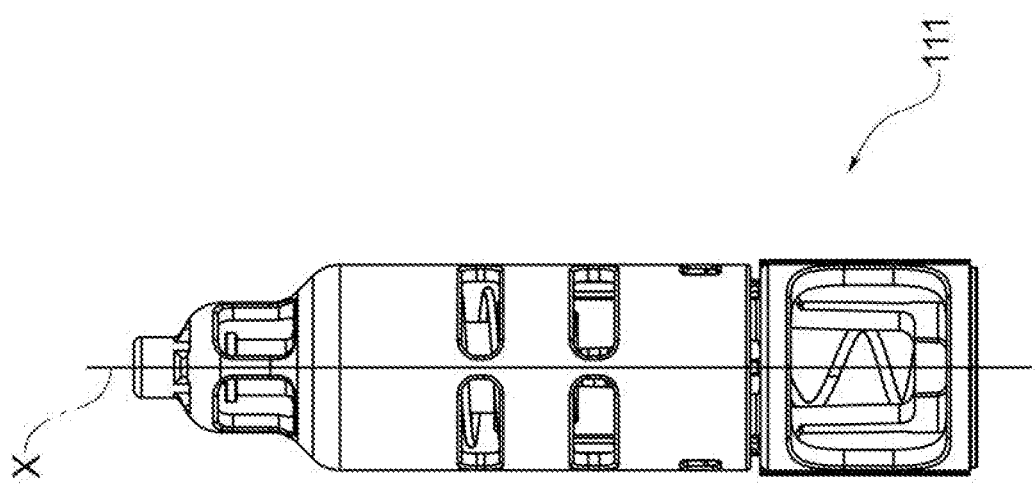

Preferably, the elastic retention body 182a" is less yielding than the elastic thrust body 182b", in such a way that, with the oil at a temperature below the lower threshold temperature value and at a pressure lower than the threshold pressure value, the valve group 10 is maintained in the first operating configuration (see FIG. 2).

According to a preferred embodiment, the valve group 10 of the present invention has a substantially axial-symmetrical structure in its components, for example the obturator openings or the outlet opening extend by a radial circumference section, or again for example, the valve body 11 has an axial-symmetric extension. Preferably, at the same axial height, in a preferred embodiment, a plurality of radial openings, for example four in number, are identified.

According to a preferred embodiment, the valve group is insertable and removable, in cartridge way, from inside duct 40. For example, the support body 4, has an access mouth 45, preferably located along axis X-X, through which the valve group 10 is insertable or removable. Preferably, the support body 4 comprises a stopper 48 suitable to close the access mouth 45 and at the same time suitable to act as axial stop for the valve group 10.

As mentioned above, an object of the present invention is also a valve group 10 for controlling the passage of oil in an oil filtering assembly 1. In other words, an object of the present invention is also a valve group 10 having the features described above, adapted to be inserted in a support body 4, in turn having the features and components described above.

Preferably, in fact, an object of the present invention is also an oil temperature management assembly 100 specifically adapted to be part of a pressurised oil circuit of a motor vehicle and having the purpose of allowing the management of the oil temperature. In other words, the oil temperature management assembly 100 is mountable in a motor vehicle in such a manner as to be fluidically connected with some components of the vehicle such as the engine, the gearbox unit, the transmission unit.

Specifically, unlike the filtering assembly 1 described above, the management assembly 100 does not necessarily have an oil filtering device 2 (which, in fact, is either not provided in the pressurised oil circuit or is arranged downstream of the oil temperature management assembly 100).

Conversely, similar to the filtering assembly 1 described above, the oil temperature management assembly 100 comprises a heat exchanger 3 and a support body 4.

Preferably, the heat exchanger 3 has the same features described above.

Similarly, also the support body 4 is attachable fixed to the engine, or to the gearbox unit, or to the transmission unit, or to a generic component comprised in the vehicle, for example by means of a specially shaped flange, and has the same features described above.

For example, the support body 4 comprises at least one duct 40 having at least an inlet mouth 41 through which the oil flows and at least one outlet mouth 42 through which the oil flows to an auxiliary device comprised in the pressurised oil circuit downstream of the oil temperature management assembly. The at least one return duct in turn comprised in the support body 4 which allows the reverse path of the filtered oil from the filtering device to the engine is not an object of the present invention and is not described herein.

Duct 40 has at least one exchanger mouth 43 on the side wall 400 which delimits it through which the oil flows in the heat exchanger 3.

In addition, on the side wall 400, duct 40 also has at least one exchanger outlet mouth 43' through which the oil coming from the heat exchanger 3 flows. Preferably, the exchanger mouth 43 is proximal with respect to the exchanger outlet mouth 43', that is to say, the exchanger mouth 43 is upstream of the exchanger outlet mouth 43'.

According to a preferred embodiment, the oil temperature management assembly 100 also comprises a valve group 10, according to the present invention, extensively described above in its components and its behaviour.

In fact, the valve group 10 is housable in duct 40, and extends in length along an axis X-X. Preferably, duct 40 extends at least in its proximal section along said axis X-X so that the side wall 400 has a radial extension with respect to axis X-X.

The behaviour of the valve group 10 housed in the oil temperature management assembly 100 is the same as described above in its housing within the oil filtering assembly: the valve group is adapted to be arranged in a first, second, third configuration (the latter in minimum and maximum) and is adapted to be arranged in a venting configuration.

Preferably, it is noted that the outlet opening 152 of the valve group 10, in this particular configuration, is facing towards the outlet mouth 42 of duct 40 to allow the oil passage towards a secondary component downstream of the pressurised oil circuit which is not necessarily a filtering device. In other words, in the application of the valve group 10 in an oil temperature management assembly, the outlet opening 152 is also indicated as an auxiliary opening being facing towards the auxiliary components of the pressurised oil circuit.

Innovatively, the oil filtering assembly and/or the oil temperature management assembly and/or the valve group described above widely achieve the object of the present invention, overcoming the typical drawbacks of the prior art.

Advantageously, in fact, the oil filtering assembly is adapted to operate with the engine in such a way as to make the latter work at its optimal operating conditions. In particular, through the management of the passage of oil through the heat exchanger, the oil is heated in such a way that it is returned filtered to the engine, but especially at the optimal temperature.

In fact, advantageously, in an operating condition corresponding to the cold engine in which the oil temperature is too low, the oil filtering assembly, in the shortest possible timing, heats the oil until it is brought to an optimal temperature range, switching from the first to the third operating configuration. In other words, advantageously, the valve group is adapted to control the oil as a function of its temperature in such a manner as to accelerate a reheating thereof, and thus accelerate the heating step of the engine itself.

Advantageously, the oil is also maintained in the optimal temperature range due to the third operating configuration; in fact, the third operating configuration is also adapted to prevent a further rise in temperature in such a way that, once achieved, it is maintained in the optimal temperature range; for example, to this end, the valve group is configurable in the third minimum operating configuration or in the third maximum operating configuration, as a function of the oil temperature.

Advantageously, the valve group, the heat exchanger and other components are protected from any damage due to pressure peaks. The oil pressure peaks are effectively managed by the valve group, which allows venting such a pressure, thus safeguarding the valve group itself from any damage, but also preserving the heat exchanger that is in fact bypassed by the oil. Preferably, this condition is effectively managed in the operating situation with cold engine, thus cold oil, typically characterised by frequent pressure peaks.

A still further advantageous aspect lies in the fact that the valve group is simple and cost-effective to manufacture.

Moreover, advantageously, the valve group is extremely versatile in its application. In fact, the valve group is easily calibrated by specially selecting the elastic retention body and the elastic thrust body, in particular by carefully selecting their elastic modulus and their size and strokes, so as to effectively manage the reaction of the obturator positioning and movement means and the axial strokes of the obturator itself. Advantageously, therefore, the valve group, depending on the final application of the oil filtering assembly, for example on small or medium sized motor vehicles or on industrial vehicles, has the same components mentioned above, changing only in its elastic components from an application the other.

Advantageously, the temperature sensitive device is completely wet by the oil, thus being ready to immediately react as a function of a change in the oil temperature.

Moreover, advantageously, no specific design of the duct is required since the valve group autonomously operates on oil; in other words, advantageously, it is not necessary to provide the duct with specific shoulders at the different obturator positions, since the valve group autonomously performs the described positions.

Advantageously, the advantages observed for the oil filtering assembly are widely found also in an oil temperature management assembly.

It is clear that a man skilled in the art may make changes to the filtering assembly, the oil temperature management assembly and the valve group described above in order to meet incidental needs, all falling within the scope of protection defined in the following claims.

LIST OF REFERENCE NUMERALS 1 oil filtering assembly
100 oil temperature management assembly
2 oil filtering device
3 heat exchanger
4 support body
40 duct
41 inlet mouth
42 outlet mouth
43 exchanger mouth
43 exchanger outlet mouth
45 access mouth
48 stopper
400 side wall
10 valve group
11 valve body
111 locking portion
115 obturator portion
15 obturator
150 obturator tip
151 obturator walls
152 outlet opening, filter opening, auxiliary opening
153' first exchanger opening
153" second exchanger opening
158 abutment step
18 obturator positioning and movement means
181 temperature sensitive device
181' control portion
181" stopper protrusion
182 pressure sensitive device
182a retention means
182a' retention portion
182a" elastic retention body
182b bypass means
182b' abutment element
182b" elastic thrust body

The invention claimed is:

1. An oil temperature management assembly comprising:
i) a heat exchanger;
ii) a support body for supporting the heat exchanger comprising a duct in fluidic communication with the heat exchanges, the duct having at least one inlet mouth, at least one outlet mouth and, on the side wall delimiting the duct, at least one exchanger mouth through which oil flows in the heat exchanger;
iii) a valve group housed in the duct,
wherein the valve group extends in length along an axis, the valve group comprising:
a valve body extending along the axis axially fixed to the support body;
a hollow obturator comprising a tip and obturator wall, the obturator extending along the axis fitted axially movably on a first end of the valve body; the obturator comprising:
a primary obturator opening formed in the obturator wall and a secondary obturator opening formed in the obturator wall and axially spaced from each other through which the oil flows towards the heat exchanger when positioned respectively aligned with the exchanger mouth, in a first operating configuration and a third operating configuration;
an obturator outlet opening formed in the tip of the obturator and spaced axially from the primary obturator opening and the second obturator opening, wherein the oil flows through the obturator outlet opening when the obturator is placed in a second operating configuration and/or in a venting configuration;
a control system for positioning and moving the hollow obturator comprising:

a temperature sensor proximate the first end of the valve body and engaging the obturator to guide the obturator based on oil temperature, into an axial position corresponding to the second operating configuration or the third operating configuration;

a pressure sensor proximate an opposite second end of the valve body to keep the obturator in an axial position corresponding to the first operating configuration and to allow movement of the obturator based on oil pressure, in an axial position corresponding to the venting configuration.

2. The oil temperature management assembly according to claim 1, wherein the third operating configuration identifies a third minimum operating configuration, in which the exchanger mouth and a secondary exchanger opening are partially aligned, and a third maximum operating configuration in which the exchanger mouth and the secondary exchanger opening are fully aligned, in which the temperature sensor allows movement of the obturator in said third minimum operating configuration and in said third maximum operating configuration, depending on the oil temperature.

3. The oil temperature management assembly according to claim 1, wherein the temperature sensor is housed on the valve body comprising, distally from the valve body, a control portion, engaging the obturator, which changes shape of the temperature sensor along the axis depending on the oil temperature.

4. The oil temperature management assembly according to claim 1, wherein the temperature sensor comprises a stopper protrusion having a radial extension, to engage the obturator in the first operating configuration and to engage the pressure sensor in the third operating configuration to prevent passage of oil towards the outlet opening.

5. The oil temperature management assembly according to claim 1, wherein the temperature sensor contains a wax body of changeable shape.

6. The oil temperature management assembly according to claim 1, wherein the pressure sensor acts with the valve body, with the obturator and with the temperature sensor, the temperature sensor comprising a retainer housed in a proximal position, engaging the valve body and the obturator to keep the obturator in the first operating configuration, and to allow movement of the obturator into the venting configuration when stressed by action of the pressurised oil.

7. The oil temperature management assembly according to claim 6, wherein the retainer comprises a retention portion integrally connected to the obturator and an elastic retention body placed between the retention portion and the valve body to exert upon the retention portion and the valve body an axial thrust action in the proximal direction.

8. The oil temperature management assembly according to claim 7, wherein the elastic retention body is a helical spring operating between the retention portion and the valve body.

9. The oil temperature management assembly according to claim 1, wherein the pressure sensor comprises an engagement device housed in a distal position, engaging the valve body and the obturator and/or the temperature sensor keep the obturator in the third operating configuration, and permit movement of the obturator into the venting configuration when stressed by action of the pressurised oil.

10. The oil temperature management assembly according to claim 9, wherein the engagement device comprises an abutment element to engage the obturator and/or the temperature sensor and an elastic thrust body placed between the abutment element and the valve body to perform on the abutment element and the valve body an axial thrust action in the distal direction.

11. The oil temperature management assembly according to claim 1, wherein the elastic thrust body is a helical spring operating between the abutment element and the valve body.

12. The oil temperature management assembly according to claim 10, wherein the abutment element has a shape axial-symmetric to the axis and is adapted, in the first operating configuration, in the second operating configuration and in the venting configuration to externally engage the obturator wall which comprises an abutment step and, in the third operating configuration, to be engaged internally by a stopper protrusion of the temperature sensor.

13. The oil temperature management assembly according to claim 10, wherein the retainer comprises a retention portion integrally connected to the obturator and an elastic retention body placed between the retention portion and the valve body to exert upon the retention portion and the valve body an axial thrust action in the proximal direction; and wherein the elastic retention body is less yielding than the elastic thrust body.

14. The oil temperature management assembly according to claim 1, wherein the valve group is insertable and removable as a self-contained cartridge from inside the duct.

15. An oil filtering assembly for filtering a predefined quantity of oil in the engine of a vehicle, comprising:
  i) an oil filtering device;
  ii) the oil temperature management assembly according to claim 1.

16. The oil temperature management assembly according to claim 1, wherein the tip of the obturator is proximate an end of the obturator opposite the valve body.

* * * * *